(12) United States Patent
MacVittie et al.

(10) Patent No.: US 11,054,538 B1
(45) Date of Patent: Jul. 6, 2021

(54) MODIFICATION AND ASSESSMENT

(71) Applicants: Kevin MacVittie, Austin, TX (US); John S. McNeely, Sackets Harbor, NY (US); George S. Smith, II, Sackets Harbor, NY (US); Richard McNeely, IV, Lacona, NY (US)

(72) Inventors: Kevin MacVittie, Austin, TX (US); John S. McNeely, Sackets Harbor, NY (US); George S. Smith, II, Sackets Harbor, NY (US); Richard McNeely, IV, Lacona, NY (US)

(73) Assignee: S-L IP, LLC, Houston, TX (US)

( * ) Notice: Subject to any disclaimer, the term of this patent is extended or adjusted under 35 U.S.C. 154(b) by 0 days.

(21) Appl. No.: 16/752,809

(22) Filed: Jan. 27, 2020

(51) Int. Cl.
*G01V 3/00* (2006.01)
*G01V 3/08* (2006.01)
(Continued)

(52) U.S. Cl.
CPC .............. *G01V 3/08* (2013.01); *E01F 9/576* (2016.02); *G01C 15/002* (2013.01); *G01V 3/083* (2013.01);
(Continued)

(58) Field of Classification Search
CPC . G01V 3/12; G01V 3/083; G01V 3/38; G01V 3/28; G01V 2210/6163;
(Continued)

(56) References Cited

U.S. PATENT DOCUMENTS 6,439,473 B1   8/2002  Meyer
7,029,199 B2   4/2006  Mayfield
(Continued)

FOREIGN PATENT DOCUMENTS

WO        2019060813 A1    3/2019

*Primary Examiner* — Raul J Rios Russo
(74) *Attorney, Agent, or Firm* — The Bilicki Law Firm, PC; James A. Cairns

(57) ABSTRACT

The present disclosure involves processes for assessing and modifying pavement surfaces using a mobile platform. An emitter associated with the mobile platform generates electromagnetic waves directed towards a portion of a pavement surface. A condition sensor associated with the mobile platform receives electromagnetic radiation from a first portion of the pavement surface and generates a first electronic signal representative of a current condition of the portion of the pavement surface. A location sensor generates a second electronic signal containing location data corresponding to the first portion of the pavement surface. A computing platform is used to process the electronic signals and create a current pavement condition data point. The computing platform may compare the first electronic signal against a reference representative of a target condition of the portion of the pavement surface, determine if there is a condition variance, and determine whether any condition variance exceeds a predetermined threshold. If a condition variance exceeds a predetermined threshold, the computing platform may generate a condition control signal which is transmitted to a pavement surface modification system, and which operates to modify operation of the pavement surface modification system in order to reduce the condition variance.

24 Claims, 14 Drawing Sheets

(51) Int. Cl.
*E01F 9/576* (2016.01)
*G01C 15/00* (2006.01)
*G01V 3/12* (2006.01)
*G01V 3/38* (2006.01)
*G01V 3/28* (2006.01)
*G01V 11/00* (2006.01)
*G01V 3/16* (2006.01)

(52) U.S. Cl.
CPC .................. *G01V 3/12* (2013.01); *G01V 3/28* (2013.01); *G01V 3/38* (2013.01); *G01V 11/007* (2013.01); *G01V 3/16* (2013.01); *G01V 11/00* (2013.01); *G01V 2210/6163* (2013.01)

(58) Field of Classification Search
CPC ........ G01V 11/007; G01V 3/16; G01V 11/00; G01V 3/08; E01F 9/576; G01C 15/002
USPC .................................................. 324/323–375
See application file for complete search history.

(56) References Cited

U.S. PATENT DOCUMENTS

| | | |
|---|---|---|
| 8,021,077 B2 | 9/2011 | Annese |
| 8,467,968 B1 | 6/2013 | Dolinar |
| 8,880,362 B2 | 11/2014 | Wilkens |
| 8,935,057 B2 | 1/2015 | Dolinar |
| 9,230,177 B2 | 1/2016 | Dolinar |
| 9,298,991 B2 | 3/2016 | Dolinar |
| 9,373,207 B2 | 6/2016 | Ricci |
| 9,465,099 B2 | 10/2016 | Oh |
| 9,528,228 B2 | 12/2016 | Allega |
| 9,726,168 B2 | 8/2017 | Wilkens |
| 9,784,843 B2 | 10/2017 | Dolinar |
| 10,145,837 B2 * | 12/2018 | Troxler ................ G01N 33/246 |
| 10,209,718 B2 | 2/2019 | Tiwari |
| 10,217,207 B2 | 2/2019 | Marra |
| 10,255,670 B1 | 4/2019 | Wu |
| 10,301,783 B2 | 5/2019 | Dolinar |
| 10,392,756 B2 | 8/2019 | Dolinar |
| 2009/0114738 A1 | 5/2009 | Annese |
| 2018/0016758 A1 | 1/2018 | Dolinar |
| 2018/0133730 A1 | 5/2018 | Wilkens |
| 2018/0230658 A1 | 8/2018 | Wilkens |
| 2019/0078274 A1 | 3/2019 | McNeeely |
| 2019/0203432 A1 | 7/2019 | Schroeder |
| 2019/0339209 A1 * | 11/2019 | Du ........................... F17D 5/02 |
| 2019/0352860 A1 * | 11/2019 | Sylvester ................ E01C 5/005 |

* cited by examiner

MODIFICATION AND ASSESSMENT

BACKGROUND

In general terms, modification and assessment of pavement may include at least three functions; assessing, marking, and removing. Assessing includes obtaining a representation of the current state of a pavement area, and may relate to, for example, whether paint is present or absent on a portion of a pavement surface; the condition of paint that is present on a runway surface; the retro-reflectivity of a pavement area; the presence or absence of pavement surface contaminants, such as rubber marks from vehicle wheels; the presence or absence of foreign object debris (FOD); the presence or absence of structural flaws in the pavement surface, such as cracks or potholes, and the presence, type, and status of elements ambient to pavement such as vegetation, landscaping, lighting, signage, and fences. Marking includes placing a marking material, such as paint and/or a reflective material such as glass beads, on the pavement surface. Removal includes removing contaminants from a pavement surface, such as rubber from vehicle wheels and/or foreign object debris, or unwanted markings.

For purposes of the present disclosure, "pavement" means any surface used or for use by vehicles, including but not limited to runways, roads of any type, and areas where vehicles may be parked or otherwise positioned when not in use; "airfield" means any area of land associated with an airport that includes a runway; and "runway" means any area of land associated with an airport that is intended for the landing, take-off, taxiing, or holding of aircraft.

Figure 1:
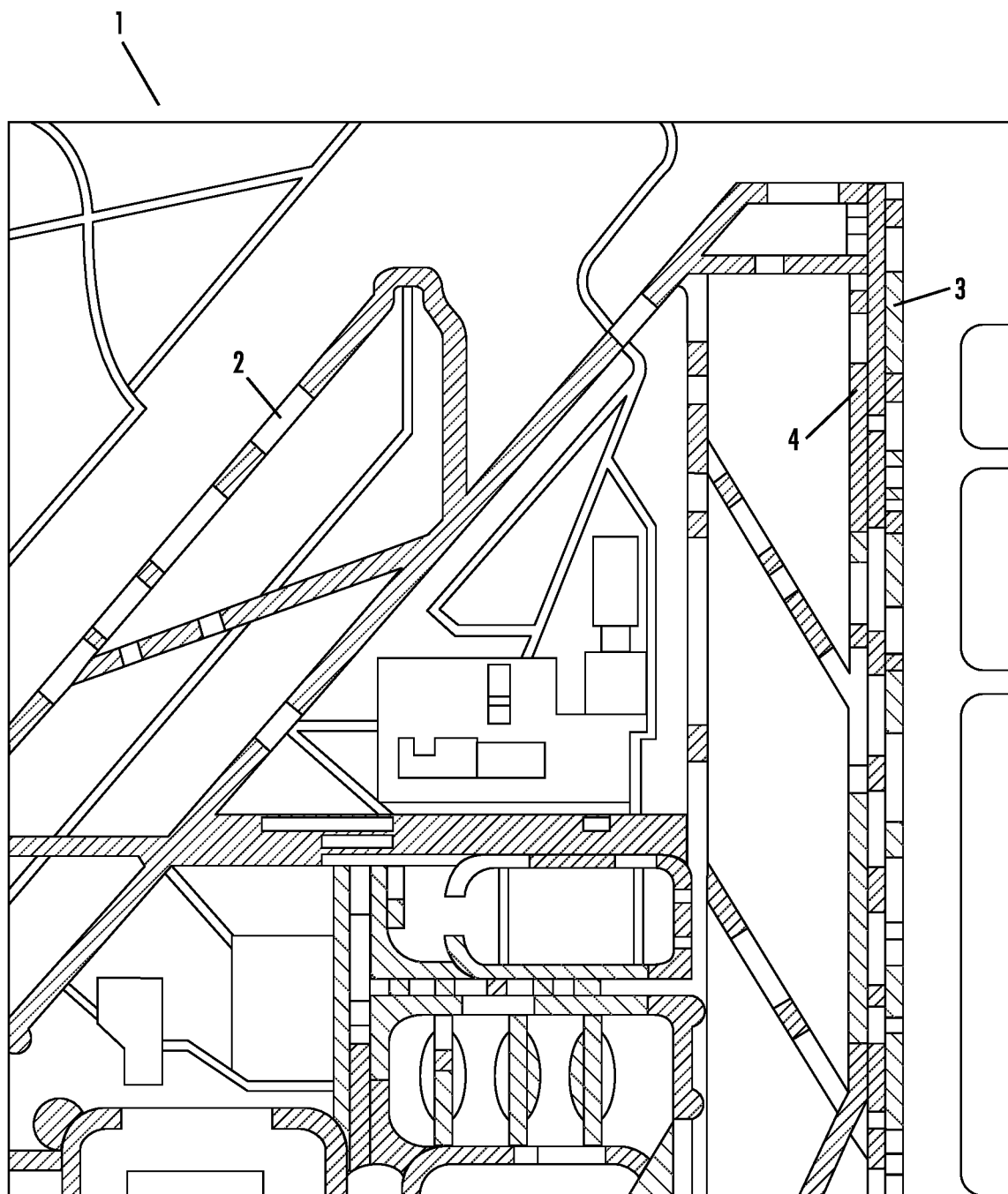
FIG. 1 is a depiction of an airfield, including a runway layout.

FIG. 1 provides an overview of airfield 1. Airfield 1 may include runway portions in various states. For example, runway portion 2 may represent a portion of runway for which there is no present need to perform or schedule modification, as indicated by its unstriped visual presentation. Runway portion 3 may represent a portion of runway for which there is a present need to schedule future modification, as indicated by its visual presentation of left-to-right downward diagonal lines. Runway portion 4 may represent a portion of runway for which there is a present need for modification, as indicated by its visual presentation of right-to-left downward diagonal lines.

While FIG. 1 represents an airfield area, the present application and its teachings also apply to the ambient airfield environment, including but not limited to landscaping, vegetation, signage, and fencing or other barriers.

DETAILED DESCRIPTION

In general, the lifecycle of pavement markings may be divided into phases. One phase is the placement of markings on pavement, as by a paint truck or line striper. Another phase is the assessment of a pavement surface, such as to determine the amount, retro-reflectivity, or other condition of markings or of the pavement surface. Another phase is maintenance, where markings are cleaned or modified to extend their lifespan. And another phase is the removal of markings, which may be to prepare for the placement of fresh markings, or because certain markings are no longer desired in their current location. The present description is directed to processes for effecting the marking, assessment, and/or modification of pavement and of environments ambient to pavement.

Pavement modification and assessment equipment may incorporate a number of components configured to perform a desired function including, for example painting, assessing surface markings, removing surface markings, assessing pavement contamination, removing pavement contamination, and assessing retro-reflectivity. Such components may be present in the form of an assessment module, a painting module, and/or a removal module. Each module may itself incorporate and/or be operably connected to a number of components, including a primary controller configured to control a desired function. These modules and/or components may be mounted onto a vehicle or, for components whose physical presence at the location where the function is being performed is not necessary, may be located remotely.

The present description may use terms such as "placing", "directing", "discharging", and "ejecting" materials on, to, or in the direction of a pavement surface to avoid any narrow or specific connotation to "spraying". As used herein, all such terms refer to the action of causing a material to come into contact with the pavement surface in a manner that accomplishes the function for which those materials are intended, such as marking or removal.

It is understood that the action of marking a pavement surface is often referred to as "striping"; for clarity, for purposes of the present application "striping" refers to any marking placed on a pavement surface, regardless of whether the resulting mark may be considered a "stripe". For example, a runway holding position sign may involve a painted area that is several feet on each side, but its placement may be considered as constituting a "striping".

The performance of pavement modification and assessment may be accomplished using a mobile platform capable of being positioned onto pavement, moved to a location on pavement, and removed from pavement. As used herein, a "mobile platform" is an apparatus whose design includes the ability to move or be moved by a motive force, which may be provided by an internal combustion, diesel, or electric motor or engine; by hydraulic or pneumatic mechanisms; by air propulsion such as that provided by a propeller, fan, or rotor; or by any other appropriate mechanism; and, which has the capability to assess and/or modify a pavement surface. A mobile platform may be associated with a vehicle, such as a paint module or carriage associated with a paint truck, an assessment module associated with a van, or a pressure-washing module associated with a truck, or may itself be a vehicle.

A mobile platform may be operated by local control, such as a human driver or operator walking adjacent to or riding on or in the mobile platform or associated vehicle, or may be operated by remote human control, or may operate autonomously. Common mobile platforms include walk-behind vehicles, ride-on vehicles, and ride-in vehicles such as vans and trucks. While use of airborne vehicles, such as drones, would be constrained at least by the need to maintain airspace safety, their use is included within the present scope.

Mobile platform components may include one or more of: an image sensor, retro-reflectometer, or other condition sensor to receive data indicative of a condition of a pavement surface and/or an ambient environment; a motor for controlling a paint carriage; an electronically controlled proportional hydraulic valve; a pressurized air control or other system for controlling the dispensing of materials including paint, reflective beads, water, or chemicals; a paint module position sensor for determining the position of a paint carriage, including "smart cylinder" technology; a speed sensor for determining the speed of the mobile platform and/or associated vehicle; a source of illumination for illuminating the pavement surface; a housing, shroud, or other suitable form of electromagnetic radiation shielding (which may be referred to herein as a "mobile light room") to reduce the effect of ambient electromagnetic radiation on the condition sensor; a laser for assisting with the alignment of a paint carriage and other tasks; a wireless transceiver for transmitting and/or receiving data (including software update data) to and from a local or remote computing platform, including a cloud computing platform; a drive shaft encoder or other means for determining an accurate distance and speed of a mobile platform; a synchronization system for synchronizing the images of a pavement mark with a location and/or time stamp; and other system components.

A mobile platform used for marking or removal may include certain basic components including a source of marking or removal material, such as paint and/or reflective beads, water, or chemicals; a source of motive force to move the marking or removal material from its source to the pavement surface; and one or more spray heads, jets, nozzles, or similar components through which the marking or removal material is directed towards the pavement surface. For convenience, all such components may be referred to herein as "spray heads".

When mounted on a vehicle, one or more spray heads may be provided on a boom, platform, carriage, or similar component that extends away from the vehicle to dispense material as the vehicle moves. The dispensing component may be on a lateral side of the vehicle, or carried in front of or behind the vehicle, to dispense material as the vehicle moves. Such a system can be configured to enable placement of a substantial volume of material on the pavement surface due to the carrying capacity of the vehicle, both in terms of the material to be applied and the sizes and capacities of the associated pumping, mixing, and dispensing or placing equipment.

More specifically, a mobile platform used for marking may include a gas or electric motor for generating pressure that is used to force a marking material, such as paint, reflective beads, or other fluids, from their source onto the pavement surface. The pressure may be provided by a pump which is fed a fluid material, such as paint, from a source, and then pumps the fluid to spray heads that are mounted and disposed so as to discharge the fluid toward the pavement surface. While paint may at times be used herein as an exemplar, it is understood that paint is merely one example of marking material and that other fluid materials, including reflective beads, thermoplastic, water, oil, solvents, chemicals, and the like can be applied in addition to or instead of paint. As used herein, "fluid" includes materials that may not be liquid but can be fluidized by the application of air, stirring, heating, or similar techniques.

Location information may be used in pavement modification and assessment to, for example, determine a starting or current position for a mobile platform, or how much a mobile platform moves in a given direction. Location information may be associated with other data gathered using the mobile platform, such as the location of a marking needing removal or replacement, of a contaminant or object needing removal, or of a portion of pavement surface, signage, or landscaping needing maintenance. In addition to the primary controller, other system components may therefore include one or more location systems such as a global positioning system (GPS), real-time kinetic (RTK) positioning system, inertial navigation systems (INS), or total station. These systems may provide location information for the proper positioning and operation of the pavement modification and assessment equipment, such as the location of pavement perimeters or areas; of markings that are to be placed or are currently in existence; and of contaminants or other issues that may require monitoring or treatment.

Figure 2:
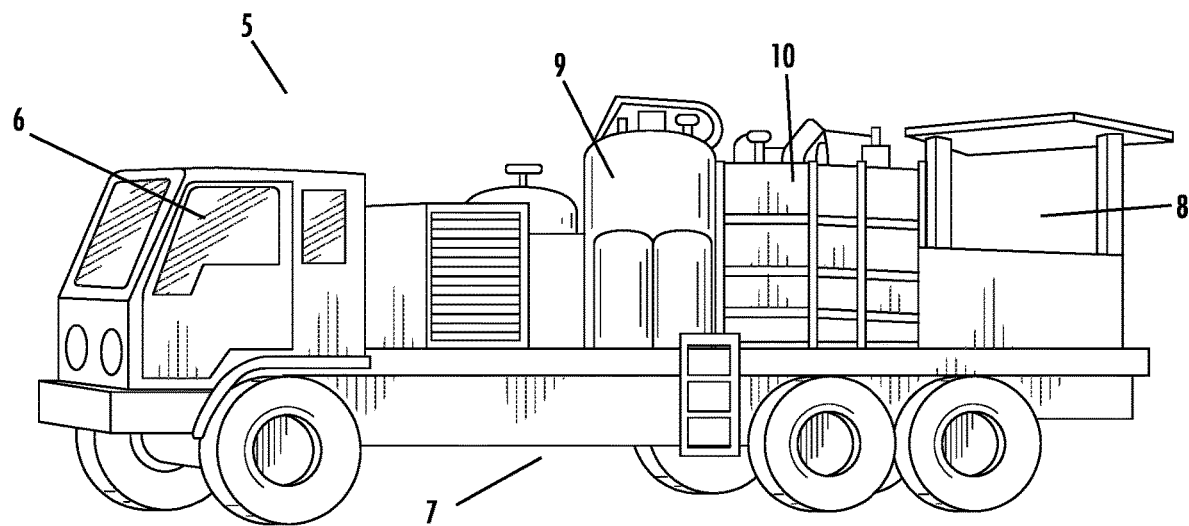
FIG. 2 is a depiction of a mobile platform for material marking.

FIG. 2 presents an embodiment of mobile platform 5 for marking, represented by a truck which includes driver cab 6 in front, main body 7, and operator cab or platform 8 in back. Main body 7 carries paint source 9 and reflective bead source 10, which are placed on the pavement using a paint carriage (not shown).

Figure 3:
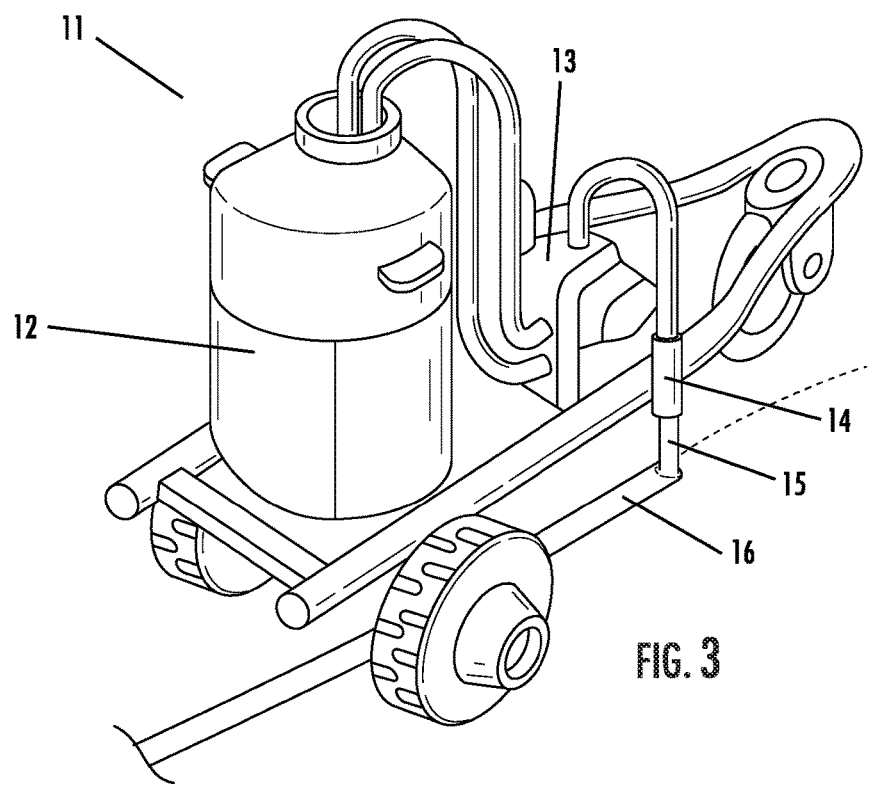
FIG. 3 is a depiction of an alternative mobile platform for material marking.

FIG. 3 presents an embodiment of mobile platform 11 for marking, represented by a self-propelled vehicle such as a walk-behind vehicle. Mobile platform 11 includes material source 12, which may for example be paint or reflective beads 15. Paint or reflective beads 15 are directed towards the pavement surface through spray head 14 using pump 13, to produce marking 16.

Figure 4:
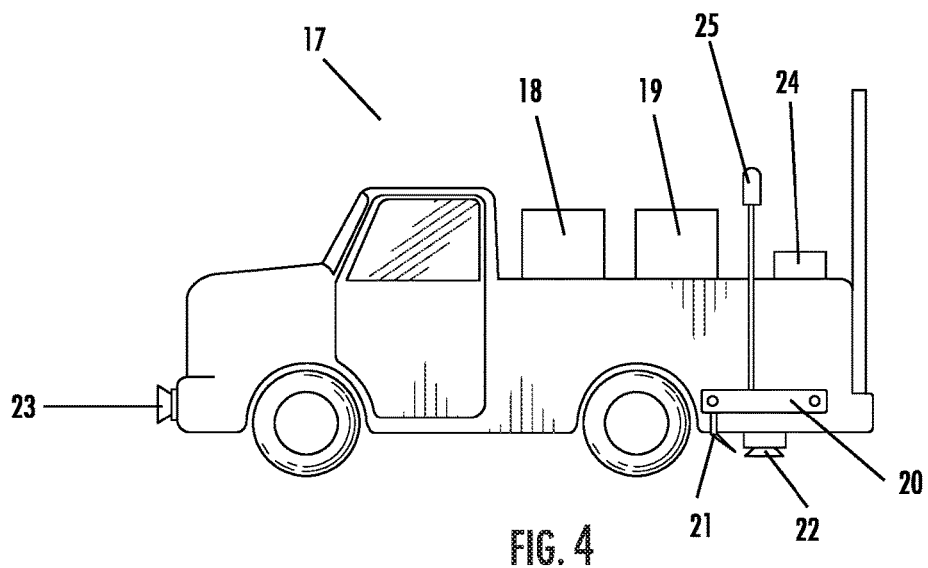
FIG. 4 is a depiction of an alternative mobile platform for material marking.

FIG. 4 presents an embodiment of mobile platform 17 for marking. Mobile platform 17, represented as a truck, includes materials source 18, pumping system 19, and movable platform or paint carriage 20. Movable platform or paint carriage 20 includes spray head system 21. Mobile platform 17 is further provided with first condition sensor 22 and, optionally, second condition sensor 23. Computing platform 24 is provided to process data received from the first and/or second condition sensors. GPS antenna 25 may be used to provide location data, which may be associated with data from the first and/or second condition sensors, and/or may be used to track the location of mobile platform 17.

Plural condition sensors may be used to, for example, provide a before-and-after representation of a portion of pavement surface, such as to enable assessment of whether a marking has been placed in the correct location, or is of the correct color, and/or is of the correct dimensions; or of whether reflective beads have been placed in the correct location or are providing a specified retro-reflectivity or meeting a particular retro-reflectivity requirement or specification; or of whether a removal process has cleaned a portion of pavement surface sufficiently. Plural condition sensors may also be used to provide data in more than one range of the electromagnetic spectrum, such as in more than one of the visible, infrared, ultraviolet, ultrasonic, and microwave spectra.

Figure 5:
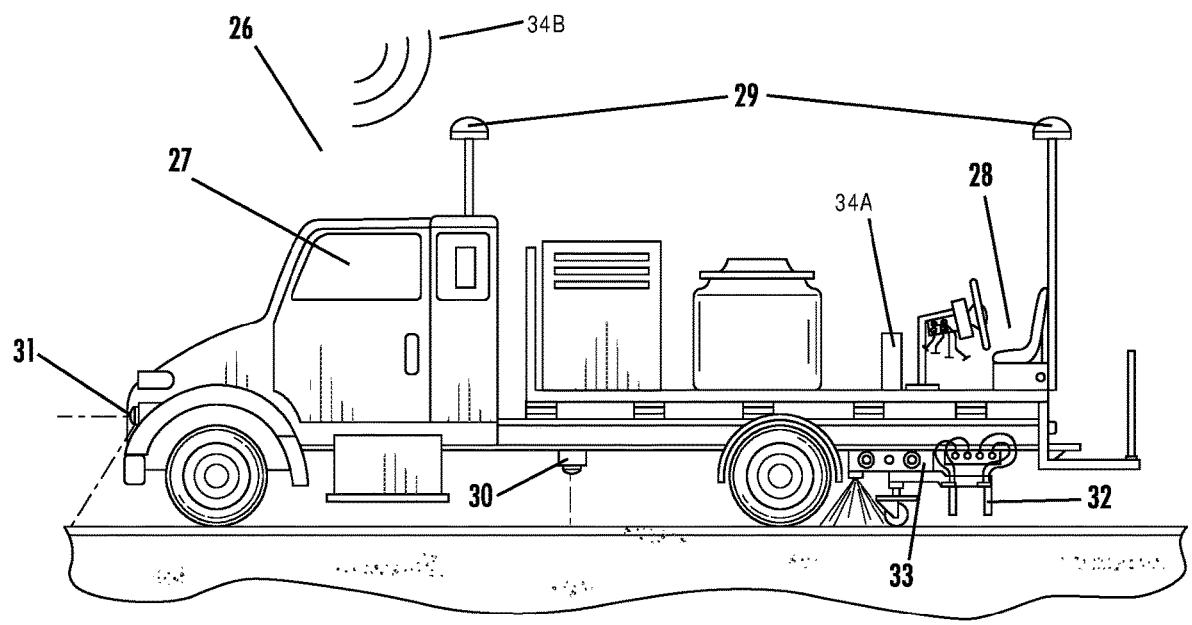
FIG. 5 is a depiction of an alternative mobile platform for material marking.

FIG. 5 presents an embodiment of mobile platform 26 for marking, represented by a truck. Mobile platform 26 may include cab 27 in front for a driver, and operator station 28 in back. Operator station 28 may be used to control aspects of the marking operation other than driving the truck, such as operation of spray head array 32 and movable cross-track carriage 33 on which spray head array 32 is mounted. First condition sensor 30, and optionally second condition sensor 31, provide data on the pavement surface to local computing platform 34A and/or to remote computing platform 34B, which may be a cloud computing platform. One or more GPS antennas 29 may be used to provide location data, which may be associated with data from the first and/or second condition sensors, and/or may be used to track the location of mobile platform 26.

Figure 9:
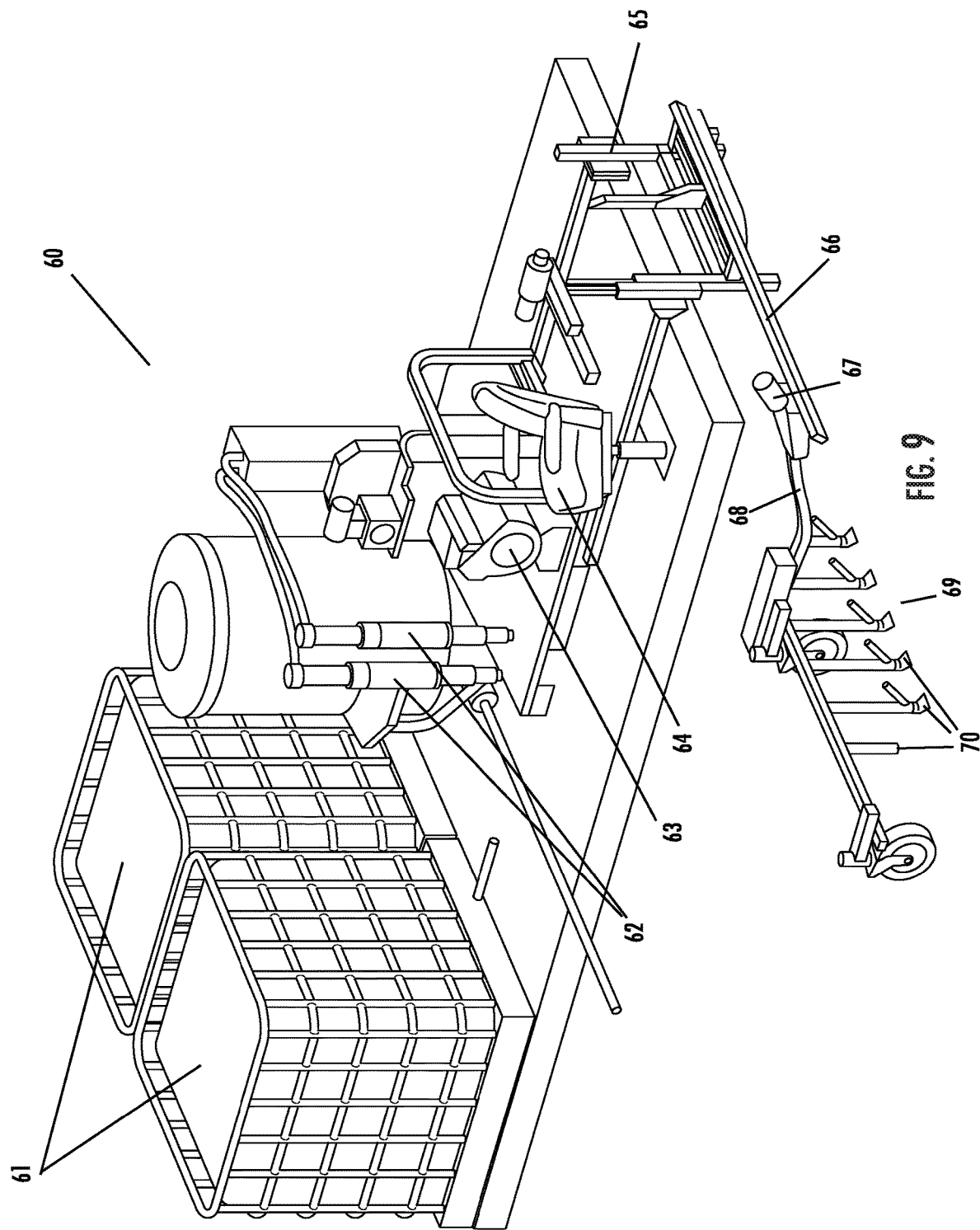
FIG. 9 is a depiction of an alternative mobile platform for material marking.

FIG. 9 presents an embodiment of mobile platform 60 for marking which, as depicted, would be a module associated with a vehicle. Mobile platform 60 includes materials sources 61, from which material is moved by pumps 62 and pump motor 63. Control and/or monitoring of the operation of mobile platform 60 may take place via operator station 64.

Boom mast 65 and beam 66 are used to carry carriage motor 67, which is connected to paint carriage 69 via boom 68. Paint carriage 69 includes spray heads 70, through which material is ejected towards the pavement surface.

Figure 15:
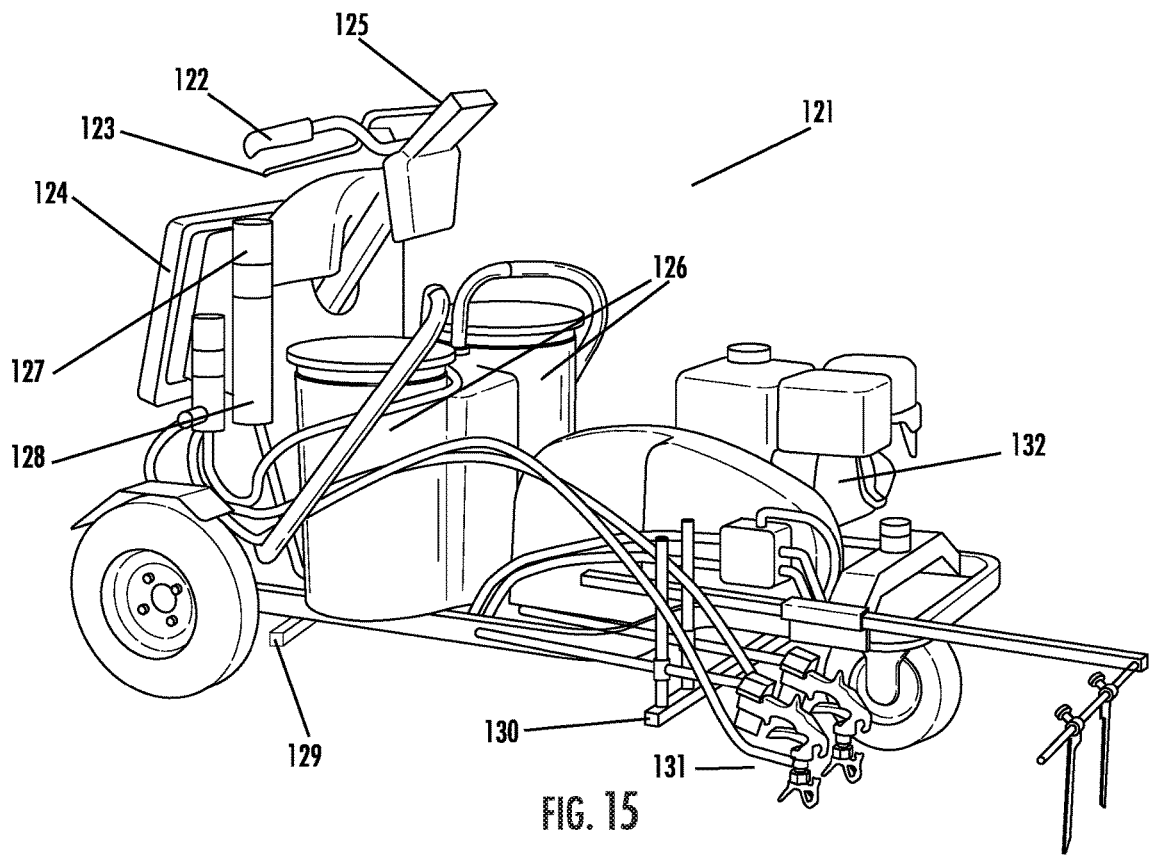
FIG. 15 is a depiction of an alternative mobile platform for material marking

FIG. 15 presents an embodiment of mobile platform 121 for marking in the form of a walk-behind or ride-on self-propelled vehicle. Mobile platform 121 may include handlebar 122, marking material placement controls 123, dashboard 124, display 125, and engine 132. The main body of mobile platform 121 may carry marking material sources 126, hydraulic motor system 127, and pump system 128 by which marking materials are ejected towards the pavement surface via spray head system 131. Rear spray head mounting system 129 and/or front spray head mounting system 130 may be provided for the mounting of respective rear and/or front spray head systems, and/or to mount additional components as desired.

A mobile platform may be used in combination with a system designed to provide information about, and/or control of, the operation of the mobile platform, including its components. Such a system may be capable of providing data collection, analysis, and/or reporting functionalities involving the status and/or operation of the mobile platform. The system may receive visual information, such as from one or more image sensors associated with the mobile platform, as well as data, such as from various sensors associated with the mobile platform. Information and data may be transmitted to a computing platform located on the mobile platform, and/or transmitted to a remote location, which may include a hand-held device, for processing and use. Output from the information system and/or computing platform may be viewed, printed, stored, and/or otherwise handled as needed.

Based on the available sensors, and as representative examples only, the information system may be configurable to receive data on the following: motion of the mobile platform, such as speed, direction, or velocity; location of the mobile platform; amount of remaining and/or used marking material; temperature of marking material; pressure used to pump marking material; flow rate of marking material; vertical, horizontal, and/or lateral position of the spray assembly and/or spray heads used to place marking material relative to the mobile platform and/or pavement surface; ambient conditions such as temperature, humidity, air pressure, air quality, wind speed, wind direction, precipitation, and/or illumination; status of an emitter or condition sensor; flow of current to and/or from peripheral devices; health of switches; input from thermocouples; and 4-20 mA signals.

Such data may be displayed directly to a local and/or remote driver and/or operator. The data may be processed by a computing platform, which may then provide processed data for display, store data, and/or generate alerts, work orders, maintenance requests, records, and any other desired output. The data may be used to provide diagnostic information for components of the mobile platform, which may provide troubleshooting support, and/or to indicate a need for adjustment, maintenance, or replacement of a component of the mobile platform. Diagnostic information may be provided to and used by a local operator, such as a driver, and/or transmitted to a remote location.

The information system may also be configured to control various aspects of the mobile platform, such as turning illumination on and off; adjusting the temperature or flow rate of marking material; operating hydraulic or pneumatic valves on the mobile platform; and adjusting the position and/or orientation of spray heads, of a paint carriage associated with the mobile platform, or of a vehicle associated with the mobile platform.

The information system may be configured to receive, process, and/or display visual information and data based upon the mobile platform with which it is used, the type of pavement assessment or modification being performed, and the particular pavement or portion of pavement being assessed or modified. Such configuration may then be stored in a configuration file for later use.

Figure 16:
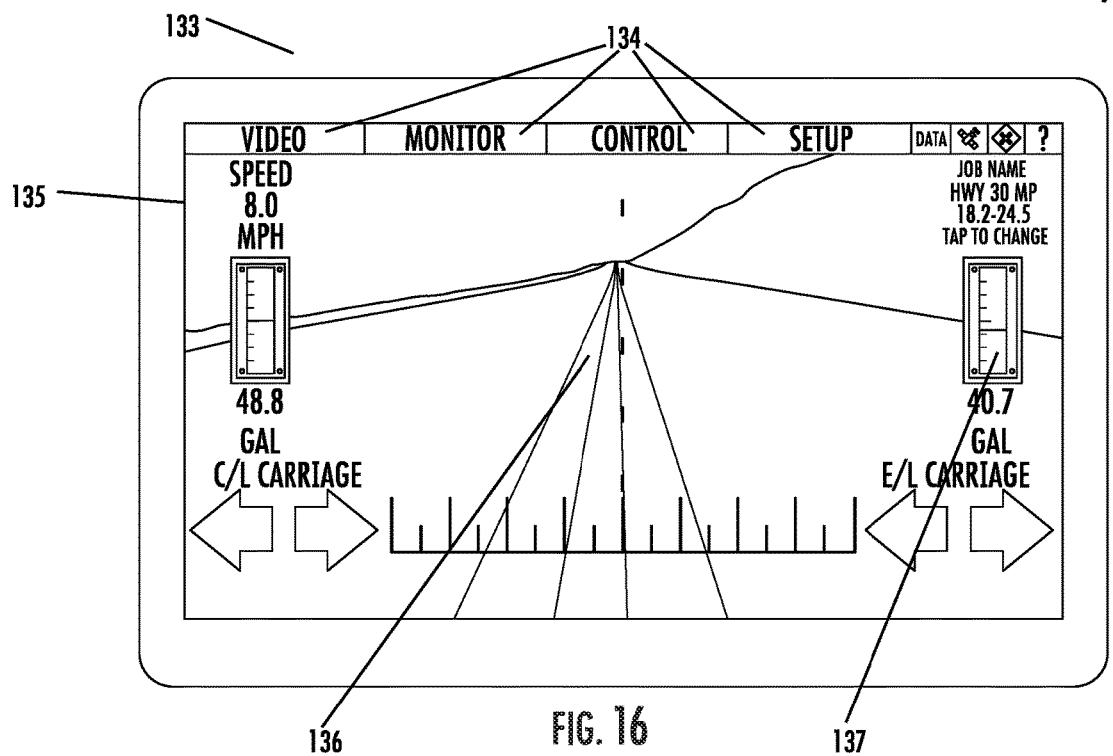
FIG. 16 is a depiction of a mobile platform control system and display.

FIG. 16 presents a representative view of a control and display system 133 that may be used in connection with a mobile platform, including but not limited to a mobile platform of the type shown in FIG. 15. Control and display system 133 may include display 135, which may include one or more visual display elements 136, such as the view from an image sensor associated with the mobile platform, as well as one or more data display elements 137, which may provide data on the mobile platform and/or its components as described hereinabove. Display 135 may include one or more tabs, or similar design element, 134, allowing an operator or other person using the system to select views and functionalities as desired. Display 135 may include the ability to accept user input, such as by touchscreen, physical or virtual keyboard, voice, and/or gesture. User input may be used to operate the functionalities of display 135 itself, and/or to modify the operation of the mobile platform, including its components. Control and display system 133 may include additional outputs to provide information and/or alerts to an operator, including visual cues such as by illuminating, changing color, blanking, or flashing the display or one or more lights associated with the mobile platform; providing audible alerts; and/or providing haptic feedback, vibration, or other tactile output.

Figure 6:
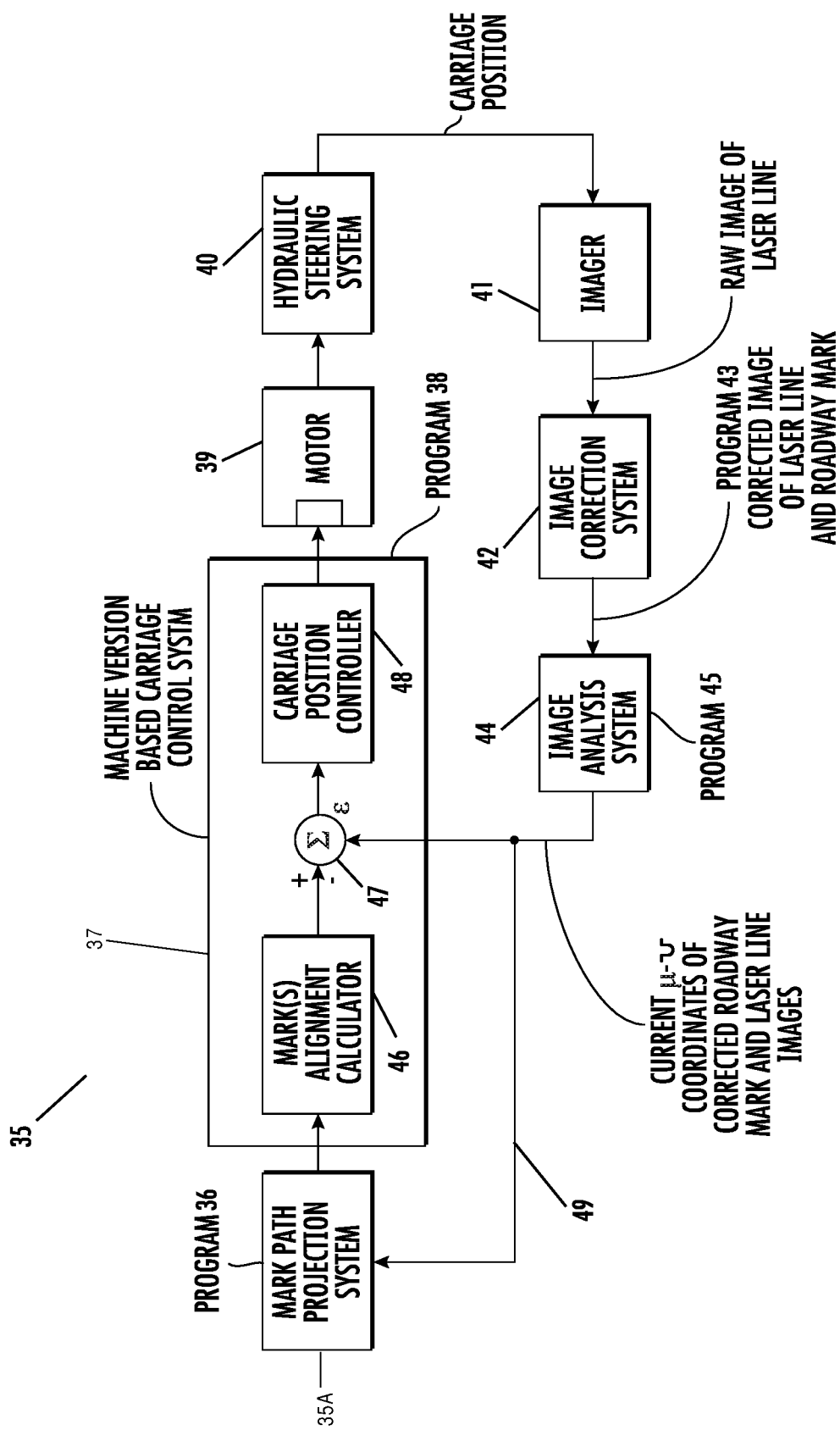
FIG. 6 is a depiction of a machine vision-based control system for material marking.

FIG. 6 presents a block diagram of a machine vision-based carriage control system 35 which may be used in connection with a mobile platform. Machine vision-based carriage control system 35 may, in cooperation with programs 43, 45, 36, and 38, command motor 39 to move mobile platform 60 and/or spray assembly 69 via hydraulic steering system 40 in a direction to align spray head assembly 69 and spray heads 70 over a given portion of pavement.

Control system 35 includes a mark path projection system 35A (which may comprise mark path projection program 36), a machine vision based carriage control system 37 (which may comprise machine vision and carriage control program 38), motor 39, hydraulic steering system 40, condition sensor 41, image correction system 42 (which may comprise image correction program 43), and image analysis system 44 (which may comprise image analysis program 45). Machine vision-based carriage control system 37 further comprises mark alignment calculator 46, comparator 47, and carriage position controller 48. Systems 35A, 37, 42, and 44 may be implemented in software, hardware (such as an FPGA), or a combination of software and hardware.

The mark path projection system 35A inputs data from image analysis system 44 via a line 49 and creates a pavement mark path mathematical projection model in image (and also object) space. This model may then be used by mark alignment calculator 46 to calculate the intersection point between a lateral projection line image space equation and a pavement mark segment image space path projection equation to predict the image space lateral position of the actual pavement mark segment as it passes under or adjacent the mobile platform at the position of the spray head lateral projection line in image space, which has been previously determined. This intersection point is the desired lateral position in image space of the spray head assembly and its respective spray head to dispense marking material directly over and onto the pre-existing pavement mark segment. The desired lateral position image space coordinate data are then input into the positive (+) input of comparator 47.

In order to have information on the current condition of pavement, it may be necessary or desirable to assess the pavement surface. As used herein, "assessment" includes, with respect to a portion of pavement surface, determining whether paint is present on a portion of pavement surface; determining the condition of paint that is present, which may include color, thickness, cure state, adherence, and reflectivity; determining whether contamination is present, including the presence and location of rubber or other markings from aircraft, or of foreign object debris; and determining whether structural flaws are present in the pavement surface, including cracks or potholes.

Figure 8:
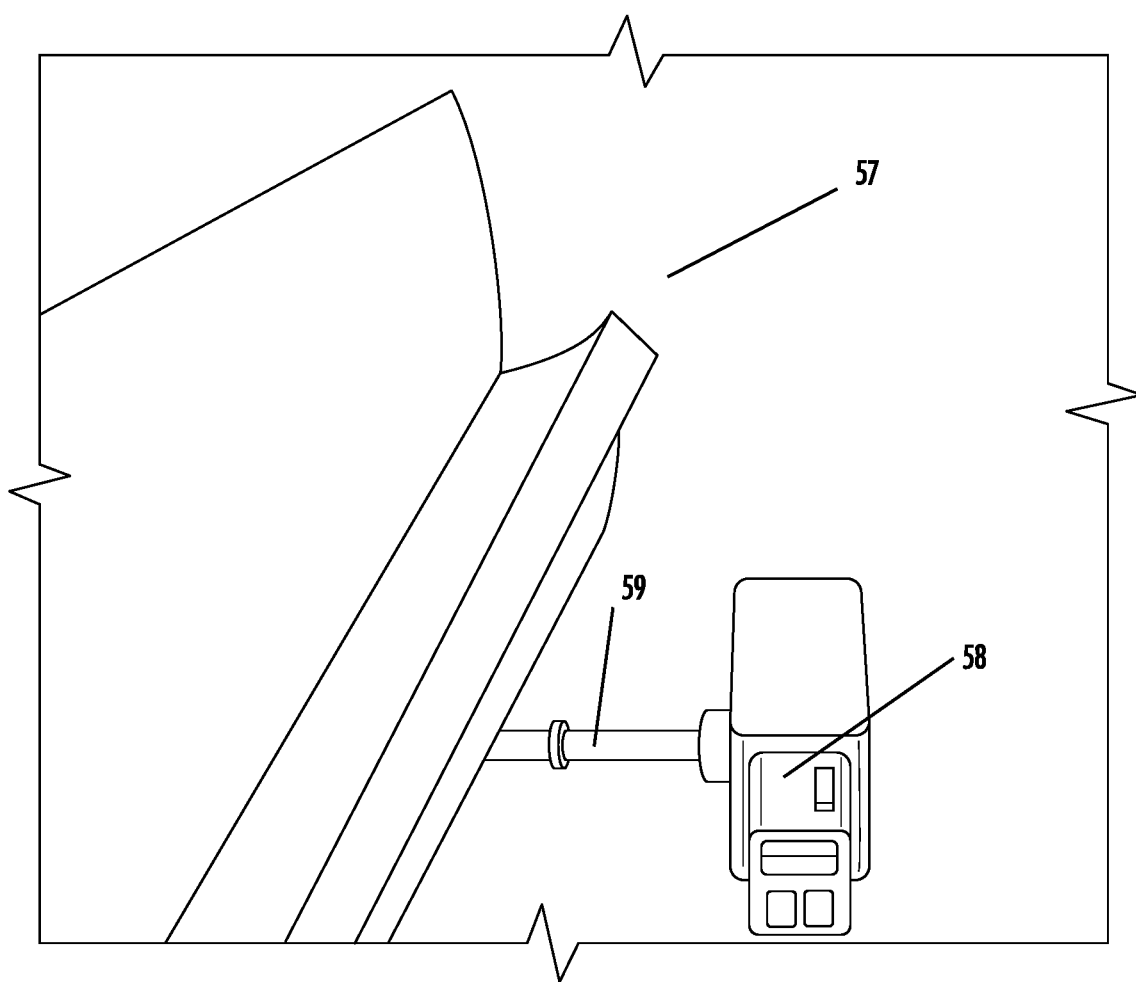
FIG. 8 is a depiction of a mobile platform for assessment.

FIG. 8 presents an embodiment of mobile platform 57, which includes assessment module 58 carried on boom 59. Assessment module 58 may include one or more condition sensors and/or emitters configured to provide data on a target condition of the pavement surface. Data from a condition sensor may be transmitted by wire to a computing platform on mobile platform 57, and/or transmitted wirelessly to a remote computing platform, which may be local to the pavement location or may be a cloud computing platform.

The computing platform may analyze the condition sensor data to provide information such as the presence or absence of markings; the color of markings; the retro-reflectivity of markings; the color of the pavement surface; the retro-reflectivity of the pavement surface; the presence or absence of pavement surface flaws, such as cracks or potholes; and the friction characteristics of the pavement surface. This data may be used for any desired purpose, including identifying the need for current or scheduled future pavement surface modification; scheduling pavement modification; preparing work orders for pavement modification; determining the type and/or amount of materials needed for pavement modification; and checking the type and/or amount of materials needed for pavement modification against an inventory and, optionally, ordering additional materials if and as needed.

Assessment may involve aspects of a pavement environment other than or in addition to a pavement surface. For example, assessment may be used with regard to elements regarding landscaping of the pavement area, such as the presence, location, type, and height of grass or other vegetation, the presence and type of wildlife, or the condition or integrity of fencing. Alternatively, assessment may be used to determine the condition of elements used to provide visual information to pilots and/or air traffic controllers, such as lights and signs.

To perform assessment and/or modification, an emitter may be associated with a mobile platform. The emitter generates electromagnetic waves, which may be directed at a portion of the pavement surface being assessed or modified. The portion of the pavement surface then emits electromagnetic radiation that is received by a condition sensor associated with the mobile platform. This electromagnetic radiation may involve reflection of the electromagnetic waves from the emitter. Alternatively or in addition, this electromagnetic radiation may involve a different form, wavelength, or spectrum of radiation resulting, for example, from excitation by the radiation of the pavement surface and/or of material on the pavement surface, such as fluorescence. The condition sensor then converts that electromagnetic radiation to a first electronic signal that is representative of a current condition of the portion of the pavement surface.

The emitter may be configured to generate electromagnetic waves in any portion of the electromagnetic spectrum that is compatible with the condition sensor being used and the condition being assessed. Generally, the emitter will generate electromagnetic waves in the visible, infrared, ultraviolet, ultrasonic, or microwave spectra, and both the current condition and the target condition will be one or more of the location of a paint band, the location of an edge of a paint band, the width of a paint band, the color of a paint band, the thickness of a paint band, the reflectivity of the portion of the surface, and the cleanliness of the portion of the surface.

In one approach, the emitter may be configured to generate electromagnetic waves in the visible, infrared, or ultraviolet spectra, and the condition being assessed will be one or more of color (which may be, without limitation, the color of paint, pavement surface, vegetation, lighting, or signs); the presence of paint; the absence of paint; the presence of a contaminant; the absence of a contaminant; a dimension of a paint marking; and the retro-reflectivity of the portion of the pavement surface, which may or may not be painted.

The emitter may, without limitation, include an incandescent bulb, a halogen bulb, a fluorescent bulb, a high-intensity discharge light, or a light-emitting diode, and the condition sensor may be an image sensor. Alternatively, the emitter may include a magnetron or a semiconductor, and generate electromagnetic waves in the microwave spectrum, or an ultrasonic transducer, to generate electromagnetic waves in the ultrasound spectrum.

The mobile light room may be comprised of an enclosed chamber or shroud, an appropriate mounting apparatus for the condition sensor, an illumination apparatus for illuminating the target, and mounting or mobility equipment for the mobile light room itself. The emitter and/or condition sensor may be associated with a component designed to reduce any interference by ambient electromagnetic waves with those generated by the emitter and/or with electromagnetic radiation received by the condition sensor from the portion of the pavement surface. For example, when the emitter is one that generates electromagnetic waves in the visible light spectrum and the condition sensor is an image sensor, the emitter and/or image sensor may be associated with a component designed to reduce the amount of ambient visible light reflecting from the portion of the pavement surface being imaged, and/or the amount of ambient visible light received by the image sensor. This component may be, by way of non-limiting example, a housing, shroud, or similar structure. A second emitter may also be used to emit electromagnetic waves that have the effect of reducing or cancelling out ambient or otherwise undesired electromagnetic radiation from reaching the condition sensor.

When the emitter and condition sensor are configured for use of electromagnetic waves in the visible spectrum, the light source should be mounted at a distance from the surface to be analyzed that will provide sufficient illumination at the surface to produce accurate condition data from the condition sensor, while minimizing the potential for ambient contamination, such as by ambient light and/or airborne particulates, of the electromagnetic radiation reaching the condition sensor; by way of non-limiting example, a distance of about one foot from the surface to be analyzed may be appropriate. It should be noted that the emitter must be mounted in such a way so as to not obstruct the view of the condition sensor.

The system comprised of the emitter, condition sensor, and mobile light room may be constructed to enable mounting of the same or substantially the same system on different types of mobile platforms, such as a van or truck as well as a stand-alone assessment mobile platform such as a trailer or modified vehicle.

A location sensor associated with the mobile platform generates an additional electronic signal, which includes location data corresponding to the portion of the pavement surface. The location sensor may obtain location data from any suitable source, including but not limited to a global positioning system, a real-time kinetic positioning system, an inertial navigation system, and a total station. The second electronic signal may further include time-of-day data.

The first electronic signal and the second electronic signal are transmitted to a computing platform, which is used to associate the location data with the first electronic signal to create a current pavement condition data point. The computing platform may also create a record of the current pavement condition data point.

Electromagnetic radiation can be used to determine the density of solid materials, such as marking material and the surface on which it has been applied. When the portion of the pavement surface being assessed includes a layer of paint, the electromagnetic waves may be configured to produce electromagnetic radiation from the layer of paint to the condition sensor that enables a determination of the depth of the layer of paint. The presence and intensity of lower density regions between this paint and the surface can also be indicative of decreased adhesion of the marking to the surface.

When plural layers of paint are present on the portion of the pavement surface, the electromagnetic waves may be configured to provide electromagnetic radiation from the layers of paint to the condition sensor that enable a determination of the density of at least one layer of paint. Density data may be used to determine the relative or absolute degree of bonding between layers of paint, or between a layer of paint and a pavement surface, and to determine whether a layer of paint is separating or delaminating from an adjacent layer of paint and/or from the pavement surface, indicating the need for present or future maintenance. Additionally, the "banding" of low- and high-density regions over a depth of paint can be counted and used to determine the number of layers of paint present. When the electromagnetic waves and condition sensor are configured to provide data regarding the density of paint, such data may be used to determine the cure state of paint. This data is associated with location data, such as GPS coordinates, in order to associate the readings with a specific marking on the airfield.

One example of a process that may be used to measure layers of material, such as paint, is as follows:

1. An emitter directs electromagnetic waves in the ultrasound spectrum towards the surface of the layers of material
2. The electromagnetic waves penetrate the surface, travel at least partially through the layers of material towards the underlying pavement surface, and ultrasound radiation is reflected based on the condition of the material
3. A condition sensor receives the reflected ultrasound radiation, which is converted to an electronic signal
4. A computing platform analyzes the electronic signal to generate data on the density of the layers of material through which the ultrasound waves/radiation traveled prior to being reflected
5. The density data is associated with location data, such as GPS coordinates, to associate the density data with a specific marking
6. If a single low-density band is detected, this indicates the presence of a single layer of material
7. If plural low-density bands are detected, the size and number of bands are analyzed to determine the number of layers, and either the density of each layer is assigned a value, or the layers are ranked in relative terms based on density.
8. The difference in density between adjacent layers is compared to a predetermined value or threshold
   a. If the difference in density is below a predetermined threshold, no action is taken
   b. If the difference in density is at or above a predetermined threshold, indicating a relatively weak bond, the marking is identified as failing or failed.

Note that, in addition to assessing the bonding between plural layers of material, this approach may be used or readily adapted to assess the bonding between a single layer of material and a pavement surface, and/or between that layer of plural layers of material that is adjacent the pavement surface and the pavement surface.

The computing platform may be used to compare the first electronic signal against a reference that is representative of a target condition of the portion of the pavement surface. Based on this comparison, the computing platform may determine if there is a condition variance between the current condition of the portion of the pavement surface, and the target condition of the portion of the pavement surface.

If a condition variance is found, the computing platform may determine whether the condition variance exceeds a predetermined threshold and, if so, generate a condition variance record based on the condition variance.

Alternatively or in addition to generating a condition variance record if a condition variance is found and is determined to exceed a predetermined threshold, the computing platform may be used to generate condition control signals based on the condition variance. The condition control signals may be transmitted to a pavement surface modification system, where they will modify operation of the pavement surface modification system to reduce the condition variance.

The pavement surface modification system may be operable to perform one or more of placing paint on the pavement surface, placing reflective beads on the pavement surface, placing water on the pavement surface, and placing chemical cleaner on the pavement surface.

The condition control signals may be operable to modify at least one of the flow rate of paint, the temperature of paint, the flow rate of reflective beads, the flow rate of water, the flow rate of chemical cleaner, the horizontal position of the surface modification system in relation to the portion of the pavement surface, the vertical position of the surface modification system in relation to the portion of the pavement surface, or the velocity of the pavement surface modification system.

The removal of features from pavement may involve removing surface features such as paint, or rubber from vehicle wheels, including but not limited to rubber on runways from aircraft landings and/or takeoffs. Alternatively, removal may involve removing foreign object debris, such as vegetation, live animals or birds, animal or bird carcasses, pieces from broken lighting fixtures or signs, misplaced tools or supplies, or dislodged pieces of pavement material.

Removal of markings previously placed on pavement, and removal of rubber marks on runways resulting from aircraft landings and/or takeoffs, are part of routine pavement maintenance. Both the removal of markings previously placed on pavement, and of rubber, may be accomplished by spraying or otherwise placing or directing fluids on or to the markings or rubber at high pressure. Because of the volume of fluid that may be involved, removal usually involves the use of a truck carrying a large tank of fluid, pumps to pressurize the fluid, and a movable boom or similar extension from the truck provided with spray heads through which the fluid may be directed at the pavement surface. While fluid may be provided to a vehicle on the pavement from a remote location through an umbilicus or similar arrangement this is generally less desirable, in part because the umbilicus restricts the range of the removal vehicle, constitutes an obstacle on the pavement surface and/or in the pavement environment, and presents the risk of leaks.

Removal may include recovery of fluid after it has been placed onto the pavement surface by using suction to pull fluid off the pavement surface into a collection or holding container. This can have the advantage of also recovering at least a portion of the displaced material, such as paint or rubber, being removed, rather than having it remain on or near the pavement surface. The recovered fluid may be collected locally, as in a tank or other container carried or towed by a vehicle, or pumped off the pavement through a hose, umbilicus, or similar arrangement to a remote location.

Because the pumps used to pressurize fluids, such as water, used for removal of markings operate at relatively high pressures, structural flaws may develop in the pumps and/or associated equipment over time. If such flaws are not detected they may eventually result in failure of the pumping system, including catastrophic failure. Microfractures can occur that are not readily detected during typical pump maintenance. Failure of the pumping system can result in disruption of a maintenance schedule because the affected parts will need to be replaced or repaired, or a replacement truck or other removal device will have to be brought on site to complete the intended removal process, which may incur additional cost and/or cause delay. Both cost and service interruptions are drastically decreased when maintenance on flawed components is performed prior to catastrophic failure. In addition, catastrophic failure presents the risk of personal injury, damage to components not directly affected by flaws, and environmental impacts, such as unintended release of cleaning fluid, requiring remediation.

The present process includes configuring an emitter to generate ultrasound waves directed at those areas of the pump equipment likely to experience such flaws, and a condition sensor, such as an ultrasound transducer, configured to receive ultrasound waves that have passed through or been reflected by those areas. Multiple emitter/transducer arrays or sweeping sensor techniques combined with inertial measurement sensors can be used to produce high-resolution three-dimension density maps. Other techniques for providing density data, such as acoustic sensing, may also be used. Characteristic anomalies present in these density maps can be used to identify flaws before they are significant enough to disrupt operation, or are visible by visual inspection. As degradation patterns are developed through continued use, a point of "just in time" maintenance can be determined, allowing for operation after the first detection of a flaw. A computing platform may analyze information from the received waves to detect flaws such as microfractures, and generate data points, records, alerts, and/or other output as desired.

One example of a process for detecting possible pump failure is as follows:

1. Continuous or intermittent sensing is performed on a pump component identified as presenting a risk of failure.
   a. An emitter or plural emitters generate ultrasound, acoustic, or other suitable electromagnetic waves;
   b. The electromagnetic waves interact with the material to be analyzed and are reflected, refracted, and scattered based on the equipment condition and conformation;
   c. An appropriate sensor, such as a transducer for ultrasound waves, detects the reflected electromagnetic waves
2. A computing platform analyzes the data to detect the presence of an anomaly
3. If no anomaly is detected, no action is taken
4. If an anomaly is detected, its level of severity is determined based on known degradation patterns
   a. If the level of severity does not exceed a predetermined threshold the equipment may be allowed to continue operation, and, if the sensing has been intermittent, the frequency of sensing is increased
   b. If the level of severity exceeds a predetermined threshold or if no determination is able to be made, pump operation may be discontinued and maintenance performed to remedy any detected anomaly.

Figure 7:
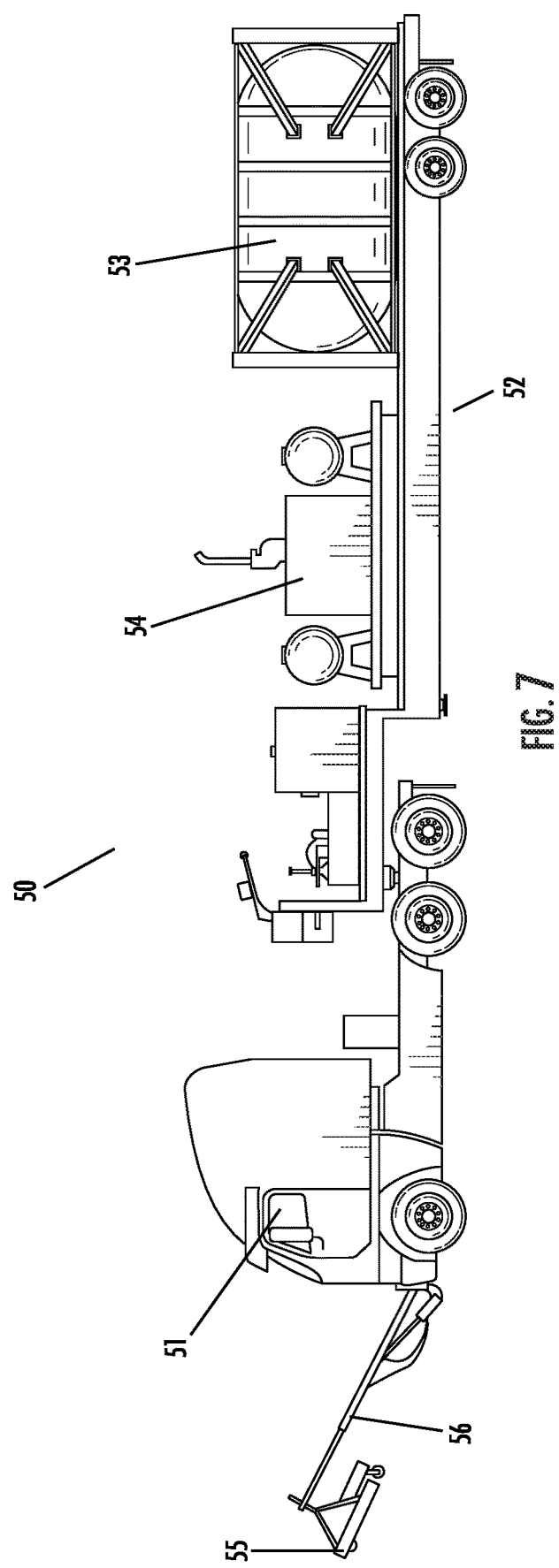
FIG. 7 is a depiction of a mobile platform for material removal.

FIG. 7 presents an example of a mobile platform 50, shown here in the form of a truck, that may be used in the removal process. Mobile platform 50 includes removal module 55, cab 51, and trailer or main body 52. Trailer or main body 52 is provided with material source 53, which may be water, chemicals, or any other fluid or fluidizable material, and with pump system 54 to move the material from material source 53 to removal module 55. Removal module 55 may be carried by a movable boom 56, which enables placement of the removal platform as desired. Removal module 55 may include a spray head assembly through which material is ejected at sufficiently high pressure to accomplish the desired removal process which, by way of non-limiting example, may involve removing paint markings or rubber marking from aircraft take-offs and landings. Removal module 55 may also include or be accompanied by a recovery module operable to recover material that has been ejected onto the pavement surface, and which may include paint and/or rubber removed by this process.

The computing platform used in the present process may include a processor located on the mobile platform, including a processor located in or integral to the condition sensor, and the first electronic signal, second electronic signal, and condition control signals may each be transmitted by wired connection or wirelessly to or from the processor as applicable. Alternatively, the computing platform may be a cloud computing platform, in which case the first electronic signal and second electronic signal may be wirelessly transmitted to the cloud computing platform, and the condition control signals may be wirelessly transmitted to the pavement surface modification system.

Wireless transmission may take place by any appropriate method, including but not limited to GSM, WiFi, WiMax, WPAN, LR-WPAN, WLAN, WMAN, Bluetooth, Zigbee, or LTE transmission. The selection of the appropriate wireless technology will be readily made based on factors such as existing wireless capabilities/communications, geographic location, signal availability, distances, data rates, location and construction of nearby buildings, and the like.

The pavement surface modification system may be operable to place at least one of paint and reflective beads on the pavement surface, with the condition control signals being operable to modify at least one of the quantity of paint being placed, the color of paint being placed, the location of paint being placed, the quantity of reflective beads being placed, and the location of reflective beads being placed.

During any of assessment, marking, or removal, it may be desirable or necessary to measure the width of markings with accuracy. This may be accomplished, for example, by using an image sensor to capture a digital image of a portion of the pavement surface, and processing the resulting electronic signal to detect and/or measure one or more dimensions of a marking contained in the captured digital image.

The captured digital image may be a grey scale digital image or a color digital image. A color digital image may be converted to a grey scale image, where each pixel in the image is assigned a value between 0 and 255. This is often referred to as the brightness value.

Methods to convert a color digital image to a grey scale digital image are commonly known and include the lightness, average, and luminosity methods. Each resulting grey scale value represents the intensity of light detected by each pixel. For example, a value of 0 may represent no light detection, or black, and 255 may represent maximum light detection, or white.

The grey scale image may represent a painted marking by a localized grouping of pixels with similar grey scale values that are significantly different in magnitude from surrounding pixels.

The measuring of line width from a grey scale digital image may require edge detection and width determination. The Canny edge detector is well known and frequently used in machine vision applications to detect edges. Other edge detector algorithms may be used, though may require more parameters and higher computational capacity than the Canny edge detector. Once the pixels are identified that represent the edges, width is determined by counting the number of pixels between subsequent edge pixels in the direction of measurement.

Alternatively or in addition to determining the dimension of a marking or other pavement feature by analysis of information from the image sensor or other condition sensor, a physical measurement reference may be provided within the field of view of the condition sensor. The physical measurement reference may include a series of marks providing an absolute or relative measurement of length, width, and/or height of a target, which may be without limitation a line, stripe, or geometric shape such as a square or rectangle; a crack, pothole, or other structural flaw in a pavement surface; foreign object debris; the height of vegetation; or the dimensions of a sign, lighting fixture, or fence or other barrier. A human operator and/or computing platform may compare the dimensions of the target with the physical measurement reference, such as to determine: whether a paint marking on a pavement surface is of the correct dimension or dimensions; the type, severity, progression, and/or appropriate corrective action for a structural flaw in a pavement surface; the nature of foreign object debris and/or the need for and type of action to address it; the need for and/or type of action to address vegetation growth; and the need and/or type of action to repair or replace a damaged or missing sign, lighting fixture, or fence or other barrier. The physical measurement reference may be integral to or attached to a housing, shield, or other structure used to reduce the effect of ambient electromagnetic radiation on the condition sensor in a manner that places it within the field of view of the condition sensor, or may be a separate component.

With regard to assessing reflectivity, pavement markings may have enhanced reflectivity of light due to the deposit of glass or other reflective beads in a painted area during the marking process. For purposes of the present discussion reflectivity means the intensity of white light, which may also be referred to as broad spectrum light, detected by the pixels of a digital imager or image sensor, and retroreflectivity means the intensity of white light detected by the pixels of a digital imager or image sensor and which originate from, and are directed back to, a source of directed illumination.

A captured color digital image may be converted to a grey scale image, where each pixel in the image is assigned a value between 0 and 255. This is often referred to as the brightness value. For example, a value of 0 may represent no light detection, or black, and 255 may represent maximum light detection, or white. Methods to convert a color digital image to grey scale are commonly known and include the lightness, average, and luminosity methods.

The reflectivity measurement in the present process may use a pre-determined histogram of pixels from a desired or target outcome, which is compared to a histogram of a real-time digital image captured during the marking process. The histogram may be a bar graph representing the frequency distribution of the pixel values in an image. Comparing the predetermined histogram to the real-time histogram may include determining if the real-time histogram counts the same number or more pixels above a threshold brightness value established by the predetermined histogram. In addition, this comparison may include a measure to determine if a pixel, or collection of pixels, in the real-time histogram meet or exceed a maximum brightness threshold established in the predetermined histogram.

While assessment of reflectivity has been described above in relation to a marking on the pavement surface, it may be readily adapted to measure the reflectivity of other aspects of a pavement surface, such as an unmarked portion, a portion with incorrect modification, or a portion having contamination such as from aircraft tire rubber.

The determination of color in pavement markings may be made by comparison to a color reference. When an image sensor captures a color digital image, each pixel of the image sensor may be assigned three brightness values indicating the pixel's detection of red, green, and blue light wavelengths. For example, the pixels of an image sensor capturing an image of a pure red target would result in brightness values of 255, 0, and 0, to indicate the relative detection of red, green, and blue wavelength light, respectively.

The color measurement may use a predetermined histogram of pixels from a desired or target outcome, and compare it to a histogram from a color image of the portion of pavement surface being assessed. The histogram may be a bar graph representing the frequency distribution of all pixel values in an image. Comparing the predetermined histogram to the histogram of an image from an actual portion of pavement surface may measure the similarity or degree of correlation between the two histograms. Color measurement may be used to determine whether a paint marking present on the pavement is within specification, or to assess the condition of a portion of the pavement that has not been deliberately marked, such as to detect the presence of rubber markings from aircraft tires on a runway, or of flaws in the pavement surface exposing material beneath the surface layer. Color measurement may also be used in connection with assessing the status of lighting adjacent to the pavement, including whether a light is active or is emitting light in the desired spectrum or of the desired wavelength(s) or of a certain intensity or range of intensity.

Alternatively or in addition to determining color by analysis of information from the image sensor or other condition sensor, a physical color reference may be provided within the field of view of the condition sensor. The physical color reference may include any desired range of colors, including multiple colors and/or multiple hues, shades, tints, and/or tones of a single color. A human operator and/or computing platform may compare the color of a target, which may be without limitation a marked portion of pavement surface, an unmarked portion of pavement surface, foreign object debris, a lighting fixture, a sign, or vegetation, with the physical color reference. The comparison may be used, for example, to determine whether a marking is of the correct color; whether a portion of pavement surface is marked or unmarked; whether a lighting fixture is providing illumination of a desired intensity and/or color; or whether a sign is of a desired color or colors, including whether a sign has weathered or otherwise faded to a point where repair or replacement may be indicated. The physical color reference may be integral to or attached to a housing, shield, or other structure used to reduce the effect of ambient electromagnetic radiation on the condition sensor in a manner that places it within the field of view of the condition sensor, or may be a separate component.

The techniques described herein may be used to determine the color of any desired target, included a marked runway surface, an unmarked pavement surface, foreign object debris, lighting adjacent to pavement, pavement signs (such as runway and roadway signs), and vegetation.

The techniques described herein may also be used to detect, and alternatively to also correct, the presence of banding between adjacent paint stripes. Banding can occur when plural, adjacent spray heads are used to place paint, reflective beads, or other marking materials on a pavement surface. Each spray head places a certain width or footprint of marking material on the pavement surface. When plural spray heads are used, each places a discrete strip of marking material on the pavement surface; however, when the spray heads are properly positioned, the edge of one strip aligns with the adjacent edge of the next strip to present the visual appearance of a single, wider strip. For example, if the use of a single spray head would produce a strip of paint approximately three inches wide, the use of two such spray heads adjacent each other would ideally produce a single, uniform strip six inches wide.

Figure 12:
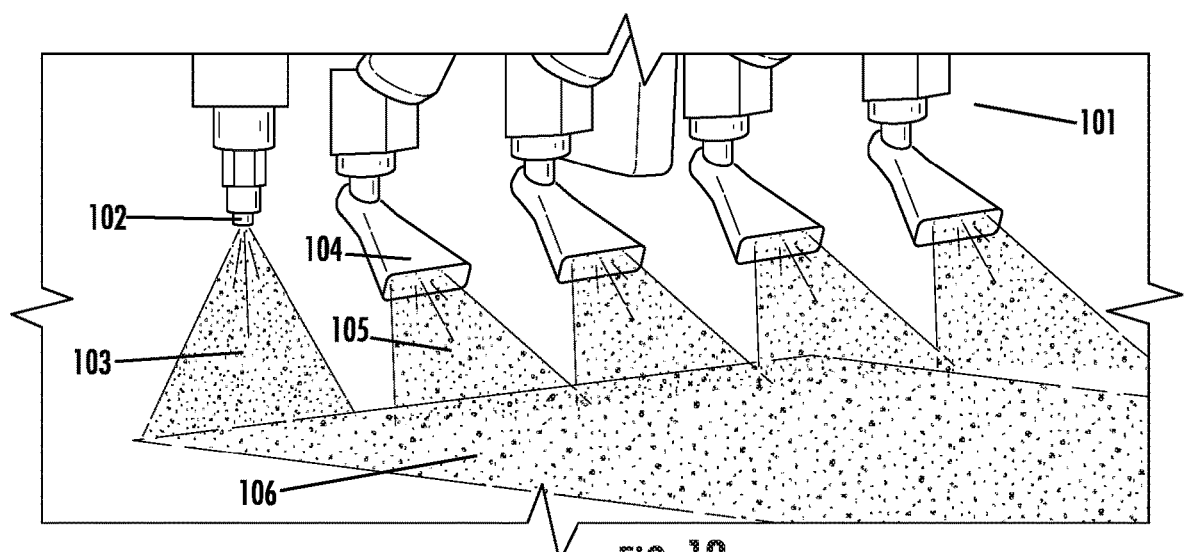
FIG. 12 is a depiction of the spray head system of a marking assembly.

With reference to spray assembly 101 in FIG. 12, as first marking material 103 leaves first spray head 102 and moves toward the pavement surface, the leading or forward edge of the first marking material may become progressively wider than the first spray head aperture from which the first marking material was ejected. Because first marking material 103 is exiting first spray head 102 under pressure, the pattern of first marking material 103 as it leaves first spray head 102 and moves towards pavement surface 106 tends to widen until it contacts the pavement surface. Such widening may be a desired characteristic of the marking process, and spray heads may be designed to produce or increase the widening effect, as seen in the approximately triangular geometry of second spray head 104 being used to eject second marking material 105 in the direction of pavement surface 106.

Figure 13:
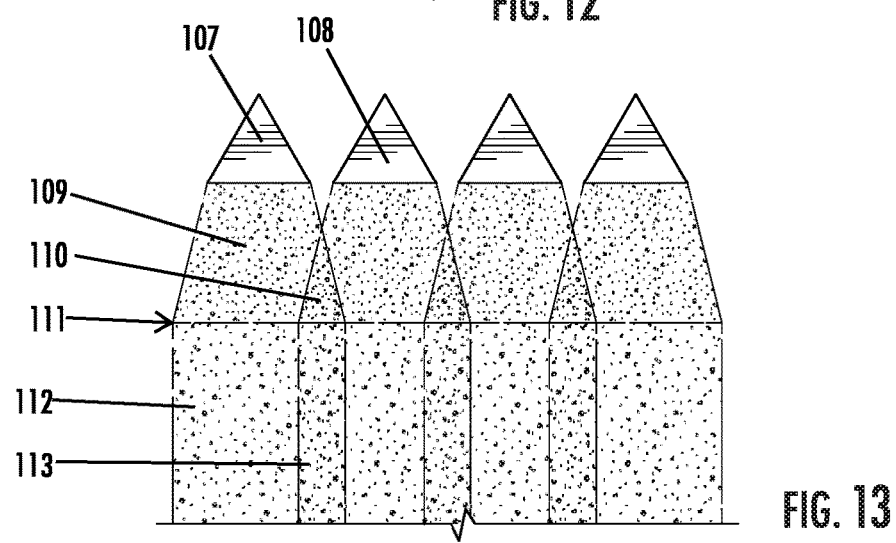
FIG. 13 is a first depiction of spray heads producing a marking pattern.

As seen in FIG. 13, if spray heads 107 and 108 are distanced too far from the point at which the materials they are spraying contact the pavement surface at 111, spray head 107 will produce a non-overlapping zone 109 of making material in the air, and spray heads 107 and 108 will produce an overlapping zone 110 of marking material in the air. As the marking material reaches the pavement surface at 111, these will produce a marking material stripe 112 from non-overlapping spray on the pavement surface, as well as a marking material stripe 113 from overlapping spray on the pavement surface. Marking material stripe 113 will be denser than marking material stripe 112, resulting in an undesirably non-uniform pattern of marking material on the pavement surface.

Figure 14:
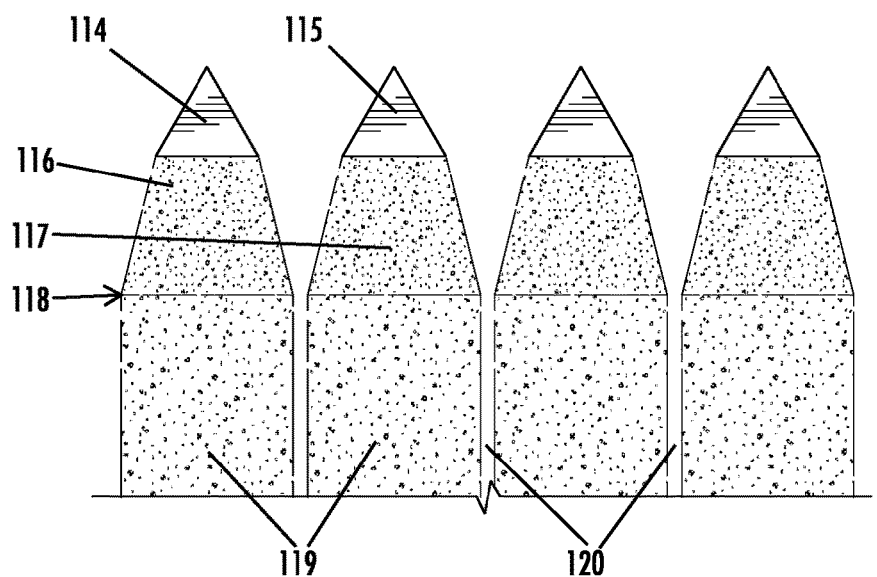
FIG. 14 is a second depiction of spray heads producing a marking pattern.

As shown in FIG. 14, If spray heads 114 and 115 are not distanced far enough from the point of contact 118 of the marking material with the pavement surface, spray head 114 will produce a zone 116 of marking material in the air, spray head 115 will produce a zone 117 of marking material in the air, and the adjacent edges of zones 116 and 117 will not converge prior to reaching the pavement surface at 118. This will result in stripes 119 having a target density of marking material, and regions 120 having a lighter density of marking material or no marking material, resulting in an undesirably non-uniform pattern on the pavement surface.

The techniques described herein regarding the use of and processing of data from image sensors may be used to detect either of the above conditions, and to generate condition control signals that will, applicable, increase or decrease the distance between the spray heads and the pavement surface, and/or change the orientation of one or more spray heads relative to the surface and/or each other, depending on the capabilities of the equipment, to reduce or eliminate the detected condition. These techniques may also be used to identity the specific spray head or heads creating either condition, assisting in effective identification and correction of the problem.

Excessive and insufficient density of marking may also occur on a transient basis as the result of temporary issues such as inconsistencies in the density of material being sprayed from moment to moment, or the occasional presence of air bubbles in the flow of material being sprayed. It may therefore be desirable or necessary to provide a threshold of excessive or insufficient marking density below which no corrective action will be indicated. Such a threshold may be based on a determination of the degree, duration, or physical dimensions of excessive or insufficient marking on the pavement surface.

Figure 10A:
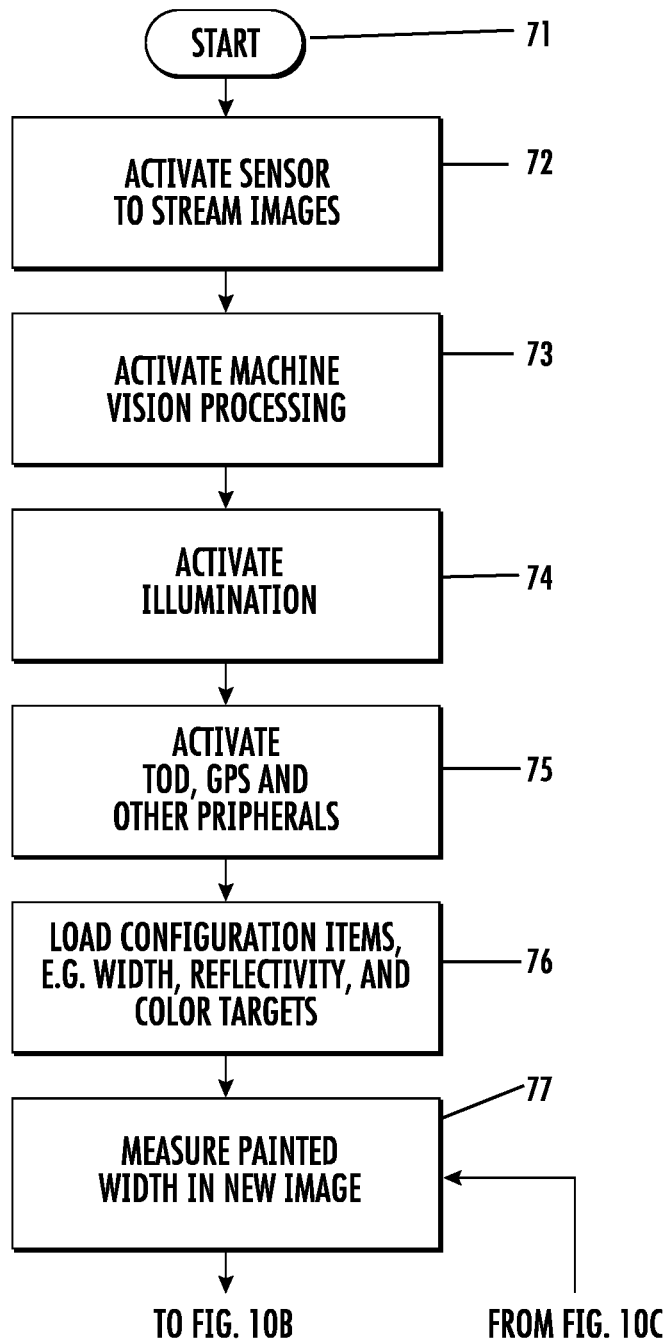
FIGS. 10A-10C are a depiction of a process for material marking.
Figure 10B:
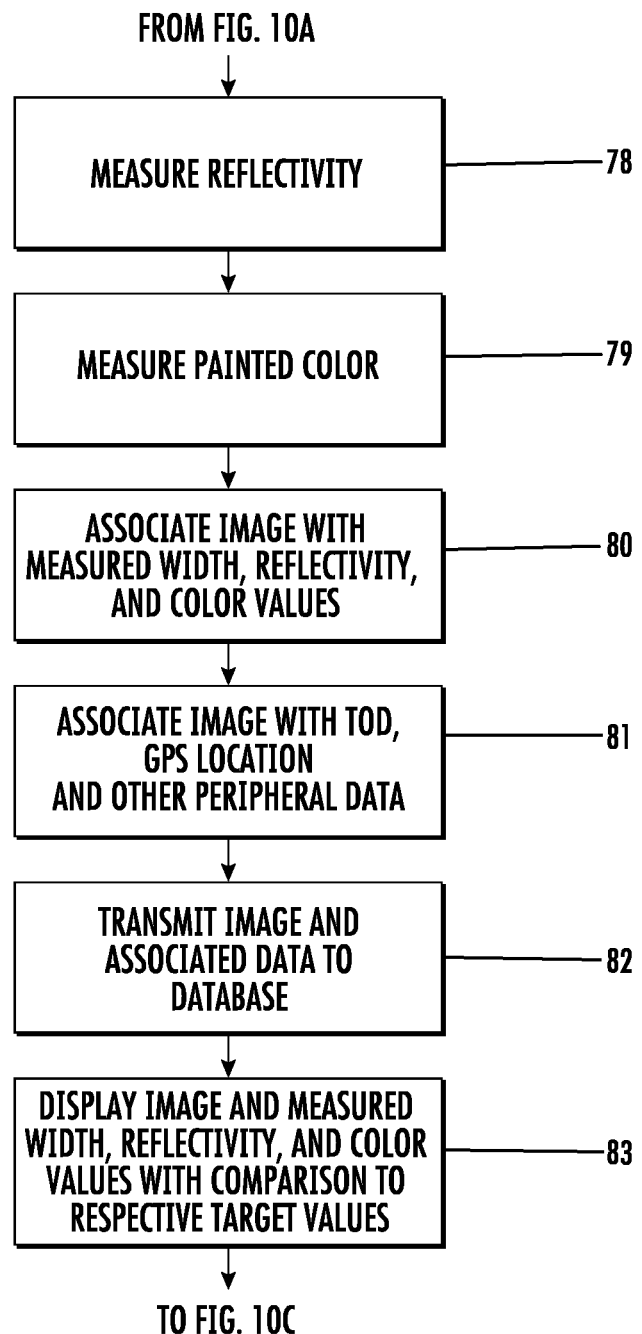
Figure 10C:
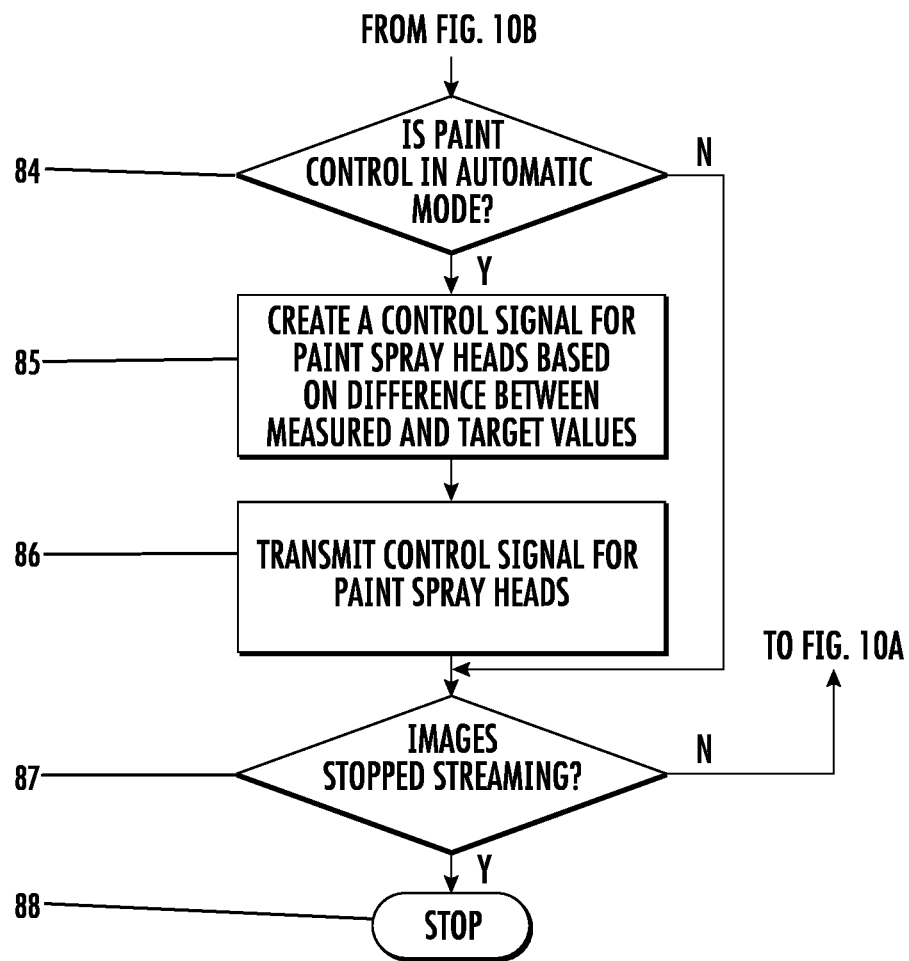

FIGS. 10A-10C present an exemplary approach by which the present process may be practiced for marking, using a camera as an example of a condition sensor. After starting the process in step 71, the camera is activated in step 72 to stream images of the portion of the pavement surface within its field of view to the computing platform, where machine vision processing is activated in step 73. Illumination is activated in step 74 to illuminate the portion of the pavement surface being captured. Additional sensor inputs are also activated in step 75, such as time-of-day and location, and configuration parameters such as line width, reflectivity, and color targets are loaded in the processor in step 76.

Once marking starts, the width, reflectivity, and color of the resulting paint line or stripe, as captured by the image sensor, are measured in steps 77, 78, and 79, respectively, and associated with the image in step 80. The image is similarly associated with the corresponding time-of-day, location, and other peripheral data in step 81. The image and associated data may then be transmitted to a central server, database, or other location in step 82, and displayed in connection with their respective target values in step 83. The process then checks whether the paint control is in automatic mode in step 84 and, if it is not, skips to step 87 below.

If the measured data varies from the target value by a predetermined threshold and the painting system is under automatic control as determined in step 84, the computing platform may generate one or more condition control signals in step 85 based on the measured variance or variances, and transmit the condition control signal or signals to the marking system in step 86. The process then determines whether images from the image sensor have stopped streaming in step 87. If images have stopped streaming, the process stops at step 88. If images have not stopped streaming, the process goes to step 77 and iterates by again measuring the width, reflectivity, and color of a paint line or stripe captured by the image sensor; associating those with the image; associating the image with the corresponding time-of-day, location, and other peripheral data; transmitting the image and associated data to a server, database, or other location; displaying the image in connection with comparison to its respective target values; creating one or more condition control signals if there is a variance that exceeds a predetermined threshold; transmitting the one or more condition control signals to the marking system; and determining whether images from the image sensor have stopped streaming.

Although the process steps described in this application have of necessity been presented in a certain order, the use of a specific order is not limiting on, or necessarily required to practice, the present method. Rather, any order may be used that is logically possible and consistent with the desired outcome.

Figure 11A:
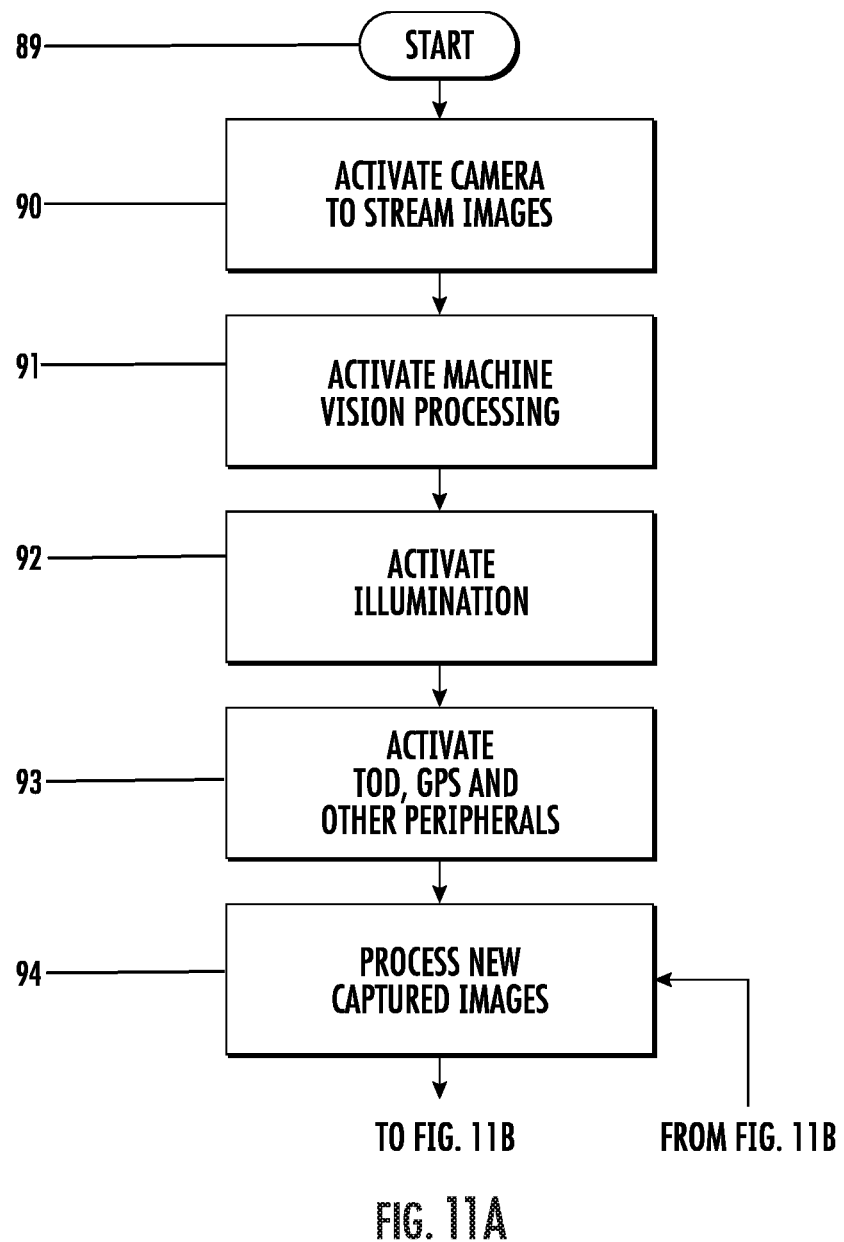
FIGS. 11A-11B are a depiction of a process for assessing the condition of a portion of a runway surface.
Figure 11B:
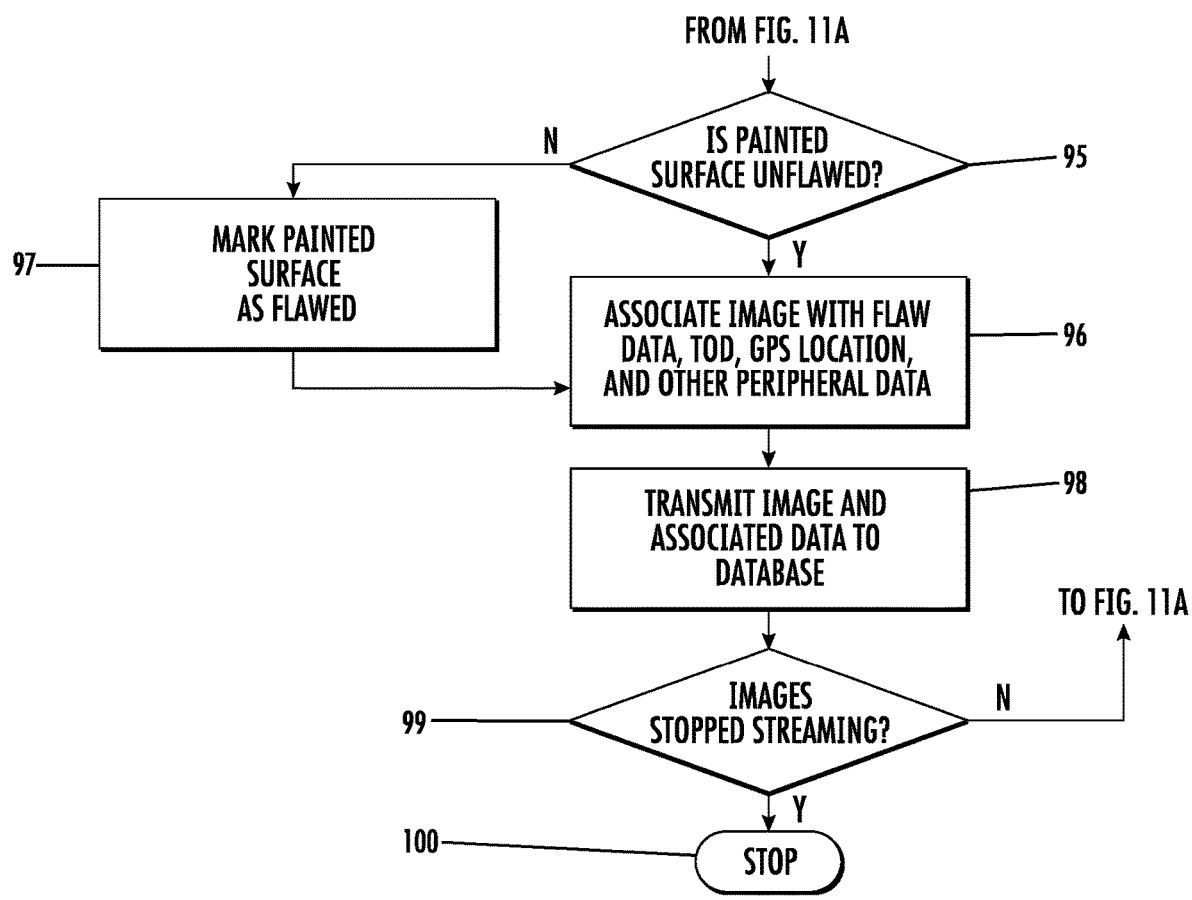

FIGS. 11A-11B present an exemplary approach by which the present process may be practiced for assessment of a painted surface, using a camera as an example of a condition sensor. After starting the process in step 89, the camera is activated in step 90 to stream images of the portion of the painted pavement surface within its field of view to the computing platform, where machine vision processing is activated in step 91. Illumination is activated in step 92 to illuminate the portion of the painted pavement surface being captured. Additional sensor inputs are activated in step 93, such as time-of-day and location. A new captured image is processed by the computing platform in step 94 and analyzed in step 95 to determine whether a flaw is present, such as missing paint or paint of the wrong color. If a flaw is detected the image is tagged as such in step 97, and associated with one or more of flaw data, time-of-day, location, and possibly other peripheral data in step 96. If no flaw is detected the image is associated with one or more of flaw data, time-of-day, location, and possibly other peripheral data in step 96. In either event the image is then transmitted to a server, database, or other location in step 98. The process then determines whether images from the image sensor have stopped streaming in step 99. If images have stopped streaming, the process stops at step 100.

If images have not stopped streaming, the process goes to step 94 and iterates by again processing a new captured image using the computing platform; analyzing the image to determine whether a flaw is present; if so, tagging the image with flaw data; whether or not a flaw is present, associating the image with one or more of flaw data, time-of-day, location, and possibly other peripheral data; transmitting the image to a server, database, or other location; and determining whether images from the image sensor have stopped streaming.

It will be apparent that the above examples may be readily adapted to use for other functions, including but not limited to measuring paint depth, assessing the cure state of paint, assessing paint layer delamination, assessing reflectivity, detecting pavement surface contamination, removing pavement surface contamination, and detecting foreign object debris.

The data generated and collected using the present process may find a number of uses. Data may be used in real time to ensure proper placement, or correction, of markings to ensure that they are present at the correct location, of the right dimensions, having the correct color, and/or possessing the correct retro-reflectivity. Alternatively, data may be used in real time to ensure proper removal of pavement markings or pavement surface contaminants by assessing the condition of a pavement surface before and/or after cleaning.

Such data may also be stored for later use, such as to generate work orders for pavement maintenance; to estimate material and/or manpower requirements for pavement maintenance; to check against and/or, as needed, replenish inventory of supplies needed for pavement maintenance; to create design, as-built, or other maps of pavement such as runways, runway areas, roadways, or roadway areas; or to document compliance with applicable rules and regulations. A historical record of such data may be used to generate a predictive model of which areas of pavement will need what types of maintenance at what times. Such data may also be used to better understand, and anticipate or mitigate against, degradation of pavement conditions. For example, a pattern of pavement surface cracks that grows over time may indicate the presence and location of a subsurface fault, or of defective pavement material; or, the data may indicate a correlation with a pattern of aircraft landings and/or take-offs, including aircraft types; or a correlation with weather conditions, such as the directions of prevailing winds or recurring storm fronts.

While the present process has been described with reference to particular embodiments, it will be understood by those skilled in the art that various changes may be made and equivalents may be substituted for elements thereof without departing from the intended scope. In addition, many modifications may be made to adapt a particular situation or material to these teachings without departing from the intended scope. In particular but without limitation, the present description has generally referred to pavement surfaces and environments such as roadways and runways; however, the processes and concepts disclosed herein may be applied in connection with other exterior and interior surfaces and environments, including but not limited to courts and fields used for sports, vehicle parking surfaces, roadway rest stops, and their respective environments.

Therefore, it is intended that the scope not be limited to the particular embodiments disclosed herein, but rather will include all embodiments falling within the scope and spirit of the appended claims.

What we claim is:

1. A method for assessing the condition of a portion of a pavement surface using a mobile platform, the method comprising:
   a) generating electromagnetic waves from an emitter associated with the mobile platform and directed at a first portion of the pavement surface;
   b) generating a first electronic signal from a condition sensor associated with the mobile platform and configured to receive electromagnetic radiation from the first portion of the pavement surface, the first electronic signal being representative of a current condition of the first portion of the pavement surface;
   c) transmitting the first electronic signal to a computing platform;
   d) using the computing platform to process the first electronic signal to create a current pavement condition data point; and,
   e) creating a record of the current pavement condition data point.

2. The method of claim 1, further comprising:
   a) generating a second electronic signal from a location sensor associated with the mobile platform, the second electronic signal comprising location data corresponding to the first portion of the pavement surface;
   b) transmitting the second electronic signal to the computing platform; and,
   c) using the computing platform to associate the location data with the first electronic signal to create the current pavement condition data point.

3. The method of claim 1 wherein in the mobile platform is associated with a vehicle.

4. The method of claim 1 wherein in the mobile platform is a vehicle.

5. The method of claim 2, further comprising using the computing platform to:
   i) compare the first electronic signal against a reference representative of a target condition of the first portion of the pavement surface,
   ii) determine if there is a condition variance between the current condition of the first portion of the pavement surface and the target condition of the first portion of the pavement surface,
   iii) if there is a condition variance, determine whether the condition variance exceeds a predetermined threshold, and
   iv) if the condition variance exceeds a predetermined threshold, generate a condition variance record based on the condition variance.

6. The method of claim 5 wherein the target condition is at least one of:
   a) the location of a paint band,
   b) the location of an edge of a paint band,
   c) a dimension of a paint band,
   d) a color of a paint band,
   e) the reflectivity of the first portion of the surface,
   f) the cleanliness of the first portion of the surface, and
   g) the adhesion efficacy of a paint band to a surface.

7. The method of claim 1 wherein the first portion of the pavement surface includes a layer of paint and the emitter and condition sensor are configured such that the first electronic signal may be processed by the computing platform to determine the depth of the layer of paint.

8. The method of claim 1 wherein the first portion of the pavement surface includes plural layers of paint and the emitter and condition sensor are configured such that the first electronic signal may be processed by the computing platform to determine the density of at least one layer of paint.

9. The method of claim 1 wherein the first portion of the pavement surface includes plural layers of paint and the emitter and condition sensor are configured such that the first electronic signal may be processed by the computing platform to determine the adhesion of at least one layer of paint to the pavement surface.

10. A method for assessing the condition of a portion of a pavement surface using a mobile platform, the method comprising:
   a) generating electromagnetic waves from an emitter associated with the mobile platform and directed at a first portion of the pavement surface;
   b) generating a first electronic signal from a condition sensor associated with the mobile platform and configured to receive electromagnetic radiation from the first portion of the pavement surface, the first electronic signal being representative of a current condition of the first portion of the pavement surface;
   c) generating a second electronic signal from a location sensor associated with the mobile platform, the second electronic signal comprising location data corresponding to the first portion of the pavement surface;
   d) transmitting the first electronic signal and the second electronic signal to a computing platform;
   e) using the computing platform to:
     i) associate the location data with the first electronic signal to create a current pavement condition data point;
     ii) compare the first electronic signal against a reference representative of a target condition of the first portion of the pavement surface;
     iii) determine if there is a condition variance between the current condition of the first portion of the pavement surface and the target condition of the first portion of the pavement surface;
     iv) if there is a condition variance, determine whether the condition variance exceeds a predetermined threshold; and,
     v) if the condition variance exceeds a predetermined threshold, generate condition control signals based on the condition variance and transmit the condition control signals to a pavement surface modification system; the condition control signals being operable to modify operation of the pavement surface modification system to effect a change of the condition variance.

11. The method of claim 10 wherein the location sensor obtains location data from at least one of a global positioning system, a real-time kinetic positioning system, an inertial navigation system, and a total station, further wherein the second electronic signal comprises time-of-day data.

12. The method of claim 10 wherein the pavement surface modification system is operable to perform at least one of:
   a) placing paint on the pavement surface,
   b) placing reflective beads on the pavement surface,
   c) placing water on the pavement surface, and
   d) placing chemical cleaner on the pavement surface.

13. The method of claim 12 wherein said condition control signals are operable to modify at least one of
   a) the flow rate of paint,
   b) the temperature of paint,
   c) the flow rate of reflective beads,
   d) the flow rate of water,
   e) the flow rate of chemical cleaner,
   f) the horizontal position of the surface modification system in relation to the first portion of the pavement surface,
   g) the vertical position of the surface modification system in relation to the first portion of the pavement surface, or
   h) the velocity of the pavement surface modification system.

14. The method of claim 10 wherein the computing platform comprises a processor located on the mobile platform.

15. The method of claim 10 wherein the computing platform comprises a cloud computing platform, further comprising:
   a) using wireless transmission to wirelessly transmit the first electronic signal and the second electronic signal to the cloud computing platform, and
   b) using wireless transmission to wirelessly transmit the condition control signals to the pavement surface modification system,
further wherein said wireless transmission comprises GSM, WiFi, WiMax, WPAN, LR-WPAN, WLAN, WMAN, Bluetooth, Zigbee, or LTE transmission.

16. The method of claim 10 wherein the pavement surface modification system is operable to place at least one of paint and reflective beads on the pavement surface, and the condition control signals modify at least one of:
   a) the quantity of paint being placed,
   b) the color of paint being placed,
   c) the location of paint being placed,
   d) the quantity of reflective beads being placed, and
   e) the location of reflective beads being placed.

17. The method of claim 10 wherein the emitter generates electromagnetic waves in the visible, infrared, ultraviolet, ultrasound, or microwave spectra.

18. The method of claim 17 wherein the emitter generates electromagnetic waves in the visible, infrared, or ultraviolet spectra, and the current condition is at least one of:
   a) color,
   b) the presence of paint,
   c) the absence of paint,
   d) the presence of a contaminant,
   e) the absence of a contaminant,
   f) a dimension of a paint marking, and
   g) the reflectivity of the first portion of the surface.

19. The method of claim 17 wherein both the current condition and the target condition are at least one of
   a) the location of a paint band,
   b) the location of an edge of a paint band,
   c) a dimension of a paint band,
   d) a color of a paint band,
   e) the reflectivity of the first portion of the surface, and
   f) the cleanliness of the first portion of the surface.

20. The method of claim 18 wherein the emitter comprises at least one of an incandescent bulb, a halogen bulb, a fluorescent bulb, a high-intensity discharge light, or a light-emitting diode.

21. The method of claim 18 wherein the condition sensor is an image sensor.

22. The method of claim 17 wherein the emitter comprises a magnetron or a semiconductor and generates electromagnetic waves in the microwave spectrum.

23. The method of claim 17 wherein the emitter comprises an ultrasound transducer and generates electromagnetic waves in the ultrasound spectrum.

24. The method of claim 10 wherein the mobile platform is associated with the pavement modification system, and the pavement modification system comprises a car, van, or truck.

\* \* \* \* \*

UNITED STATES PATENT AND TRADEMARK OFFICE
CERTIFICATE OF CORRECTION

PATENT NO. : 11,054,538 B1
APPLICATION NO. : 16/752809
DATED : July 6, 2021
INVENTOR(S) : Kevin MacVittie et al.

It is certified that error appears in the above-identified patent and that said Letters Patent is hereby corrected as shown below:

In the Claims

Column 19, Line 45, Claim 3, please delete "wherein in" and insert --wherein--;

Column 19, Line 47, Claim 4, please delete "wherein in" and insert --wherein--;

Column 20, Line 3, Claim 6, please delete "of the surface" and insert --of the pavement surface--;

Column 20, Line 4, Claim 6, please delete "of the surface" and insert --of the pavement surface--;

Column 21, Line 8, Claim 13, please delete "at least one of" and insert --at least one of:--;

Column 22, Line 16, Claim 18, please delete "of the surface" and insert --of the pavement surface--;

Column 22, Line 23, Claim 19, please delete "of the surface" and insert --of the pavement surface--;

Column 22, Line 24, Claim 19, please delete "of the surface" and insert --of the pavement surface--.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*